(12) United States Patent
Wiegand

(10) Patent No.: US 6,700,536 B1
(45) Date of Patent: Mar. 2, 2004

(54) SYSTEM AND METHOD FOR DETERMINING A DIRECTION OF INCIDENT ELECTROMAGNETIC SIGNALS

(76) Inventor: Richard J. Wiegand, 259 Finnegan Dr., Millersville, MD (US) 21108-2575

( * ) Notice: Subject to any disclaimer, the term of this patent is extended or adjusted under 35 U.S.C. 154(b) by 0 days.

(21) Appl. No.: 10/277,956

(22) Filed: Oct. 23, 2002

Related U.S. Application Data

(60) Provisional application No. 60/330,564, filed on Oct. 25, 2001.

(51) Int. Cl.[7] ................................................. G01S 5/02
(52) U.S. Cl. ........................ 342/417; 342/442; 342/444; 342/445
(58) Field of Search ................................ 342/417, 424, 342/442, 443, 444, 445

(56) References Cited

U.S. PATENT DOCUMENTS

| | | |
|---|---|---|
| 4,169,245 A | 9/1979 | Crom et al. |
| 4,870,420 A | 9/1989 | Apostoles |
| 4,977,365 A | 12/1990 | Tsui et al. |
| 5,198,748 A | 3/1993 | Tsui et al. |
| 5,255,000 A | 10/1993 | Puzzo |
| 5,265,121 A | 11/1993 | Stewart |
| 5,334,984 A | 8/1994 | Akaba |
| 5,404,144 A | 4/1995 | Vlannes |
| 5,465,097 A | 11/1995 | Fry |
| 5,477,230 A | 12/1995 | Tsui |
| 5,497,161 A | 3/1996 | Tsui |
| 5,541,608 A | 7/1996 | Murphy et al. |
| 5,572,213 A | 11/1996 | Noneman et al. |
| 5,936,575 A | 8/1999 | Azzarelli et al. |
| 6,140,963 A | 10/2000 | Azzarelli et al. |
| 6,195,043 B1 | 2/2001 | Azzarelli et al. |
| 6,239,747 B1 | 5/2001 | Kaminski |
| 6,255,991 B1 | 7/2001 | Hedin |
| 6,313,795 B1 | 11/2001 | Herrmann et al. |

OTHER PUBLICATIONS

US 5,969,677, 10/1999, Herrmann et al. (withdrawn)

*Primary Examiner*—Dao Phan
(74) *Attorney, Agent, or Firm*—Rosenberg, Klein & Lee

(57) ABSTRACT

A system and method are provided that includes at least a pair of spaced antennas having overlapping fields of view. The system further includes at least a pair of receivers respectively coupled to the pair of antennas. Each of the receivers includes a spectral separator having a plurality of output signals. Each of the output signals represents a signal value at one of a plurality of predetermined frequencies. A plurality of analog to digital converters are coupled to a corresponding one of the spectral separators for respectively providing a digital representation of each of the output signals. A digital processor coupled to an output of each of the plurality of analog to digital converters calculates an angle of arrival of the transmitted signal in at least one dimension from the digital representations.

21 Claims, 12 Drawing Sheets

SYSTEM AND METHOD FOR DETERMINING A DIRECTION OF INCIDENT ELECTROMAGNETIC SIGNALS

This application claims the benefit of U.S. Provisional Application Ser. No. 60/330,564 filed Oct. 25, 2001.

BACKGROUND OF THE INVENTION

1. Field of the Invention

This invention is directed to a system for determining a direction of incident electromagnetic signals. More particularly, this invention is directed to a system for determining the angle of arrival of a radio frequency signal, in one or two dimensions, utilizing a pair of simple wideband broadbeam spaced apart antennas in a receiver which includes an analog spectral separator. Further, this invention directs itself to analog spectral separation schemes utilizing narrow band filtering of radio frequency or intermediate frequency signals that are digitized utilizing analog to digital converters having a relatively low sampling rate. Still further, this invention is directed to a method for determining a direction of incident electromagnetic signals where received signals from a pair of antennas are processed by analog circuits to provide a plurality of signal samples that provide a frequency domain representation of the received signal from which phase difference information can be extracted and utilized to compute an angle of arrival for the received signal.

2. Prior Art

Many applications require the ability to determine the location of an emitter of electromagnetic signals, especially those associated with the military. Military aircraft, for example, have a need to sense the radio frequency environment for real-time defensive and offensive purposes. The direction from which an attack may be coming is critical information required by the pilot, which may be ascertained by identifying the direction from which a particular radar beam is being emitted. A number of methods for determining the angle of arrival for such radio frequency signals have been developed. One such method is the triangulation of coordinated receiver data from multiple widely displaced aircraft. For individual aircraft, several techniques have been developed, including an amplitude-difference approach, an interferometer approach, and a time difference of arrival approach. When simple broadbeam wideband antennas are installed, these approaches generally determine the angle in just one dimension. Most commonly, the antennas are separated horizontally, and often the measured angle of arrival is treated as being equal to the azimuth angle based on the assumption that the signal originated near the horizon, making the elevation angle approximately zero.

The amplitude-difference angle of arrival measurement approach is a commonly used approach for military fighter aircraft because it is relatively simple and inexpensive to implement. The amplitude-difference approach is based on the utilization of antenna gain variation as a function of angle of arrival. Such a system makes its angle of arrival determination by comparing the intercepted amplitude at each of the plurality of antennas disposed around the aircraft, and deducing the angle that must have caused the amplitude ratios therebetween. The problem with the amplitude-difference approach is that it is not very accurate because of calibration difficulties. These systems need to operate on a wideband basis because the radar that they are intended to intercept can be operating at any frequency across a wide range of possibilities. Although normally the processing is independent of carrier frequency, since the amplitude measurements are usually based on the signals (video) envelope (the carrier having been stripped off), calibration issues create an indirect frequency dependence. The antenna patterns vary considerably with frequency, and although calibration lookup tables are helpful, they are difficult to determine utilizing ground measurements and vary from individual aircraft to aircraft and may even vary based on the varying weapons configuration of each aircraft. Gain variations as a function of the unknown elevation angle also introduces significant errors.

The interferometer approach, while providing angle of arrival measurements that have high resolution and accuracy, are expensive and usually impractical to mount on a fighter aircraft. Such systems are usually limited to a larger intelligence gathering aircraft. The multiple antennas of the system are physically separated, and for long-baseline interferometers, the sensors are especially spaced far apart. Due to the physical separation of the antennas, the propagating wave's carrier will generally have a unique phase angle for each individual antenna location. The receiver measures this carrier phase for the received pulse and passes the phase data to a central processing unit. The central processing unit takes the difference of the phase, multiplied by a constant, and uses trigonometry to solve for the angle of arrival. The constant utilized in the calculation depends on the distance between the sensors, the speed of propagation of the wavefront and the frequency of the carrier. For the interferometer approach, the angle of arrival of resolution is proportional to the antenna separation. However, because the carrier phase angles have a modulo 360° characteristic, an antenna system with a long baseline, operating in the frequency bands of interest, will not provide a unique solution. For example, such a system that measure 10° difference between the signals intercepted by the two antennas, would not know whether the true additional propagation delay corresponded to 10°, 370°, 730° or any other combination of 10° plus a multiple of 360°. Thus, to get a unique solution, the interferometer approach requires additional antennas at precise locations between the two furthest-apart antennas. The antenna locations are precisely selected so that, for any frequency in the band of interest, the set of phase differences provides a unique solution for the angle of arrival. A typical interferometer system will have from three to five antennas to cover the field of view, depending on the operating bandwidth and center frequency, the greater the bandwidth, the more antennas needed to resolve the ambiguities. Further, the multiple antennas are usually pointed in the same direction, and the overlapping beam widths are made as wide as possible, sometimes approaching 180°. The number of antennas required for the interferometer approach creates many difficulties for application on fighter aircraft. Whereas a quadrant amplitude-difference approach would use just four 90° beamwidth antennas, the interferometer approach might need fifteen antennas (five 120° beamwidth antennas for each of three fields of view). The number of antennas and cabling required therefor also adds to the complexity and difficulty in calibrating such a system.

The time difference of arrival approach determines the angle of arrival by measuring the time difference between when the RF wavefront strikes two antennas. The approach is generally implemented with a high-speed counter that measures the time between threshold crossings of the envelope of the signals intercepted by the two antennas. The envelopes, or video signals, are generated by wideband detectors which rectify the RF carrier voltage. The angle of arrival is calculated utilizing conventional mathematical and trigonometric processing. Since the time difference of arrival approach uses the envelope, stripping off the carrier from the signal, the approach has the advantage that the processing normally does not depend on the carrier frequency, unlike the interferometer approach. A fixed envelope-delay error can generally be calibrated out easily at any one carrier frequency, with the calibration result being good for the whole band. However, like the amplitude-difference approach, there is an indirect-frequency dependence via frequency-dependent gain differences in the antenna and other front-end components. While the time difference of arrival approach would have good resolution for acoustic or vibrational waves, the propagation speed of electromagnetic waves are so fast that it is difficult to count correspondingly fast to get adequate resolution. The antenna spacing limitations on military aircraft requires a resolution better than one nanosecond, which is difficult to obtain. Further, if the pulse's leading edge has a significant slope, then gain variations between the two channels will result in the time between threshold crossings not being equal to the time difference of arrival, causing significant angle of arrival measurement error. Further, such fine-grain time measurement requires very wide receiver bandwidths, the wide bandwidth receiver then being subject to receipt of interfering signals and noise along with the signal of interest. The interference caused by the unwanted simultaneous receipt of signals is especially difficult to deal with. Additionally, for signal modulations other than pulse modulation, such as frequency modulation or phase modulation, the time difference of arrival implementation completely fails to make the required measurement. Even if a modern digital receiver approach is implemented to provide the programming flexibility to deal with frequency or phase modulated signals, and to include filtering to reduce the effects of interference, the characteristics of the analog to digital converters needed result in poor resolution. The sampling period of the converters needs to be much less than the expected time different of arrival. On the one hand, where high amplitude resolution analog to digital converters are used, such do not have a sufficiently high sampling rate and thus produce a time difference of arrival measurement that is too coarse. On the other hand, if sufficiently fast analog to digital converters are utilized, then such will have coarse amplitude resolution and make the system vulnerable to non-linear intermodulation-causing interference by strong simultaneous signals.

A variation of the time-difference-of-arrival approach is to use the programming flexibility of digital receivers to make the needed calculations using frequency-domain processing; the phase slope with respect to frequency being proportional to the time difference of arrival. However, it does not matter if the processing is in the time domain or the frequency domain; practical analog to digital converters cannot provide the needed information for the aforesaid reasons.

In order to overcome the problems of the conventional methods for measuring angle of arrival, the present invention provides a system and method for measuring the angle of arrival in two coordinates, such as azimuth and elevation, using just two horizontally-separated broadband widebeam antennas with overlapping fields of view, utilizing analog processing to spectrally separate the received signal and digital processing to make the needed calculations based on the spectral phase values. The angle of arrival measurement approach of the present invention measures pairs of phase values for two antenna inputs at two or more spectral locations within the signal bandwidth, subtracts to get the phase difference for each of the pairs of values, subtracts to get the phase difference values with frequency change, computes the phase-difference slope with respect to frequency, and uses mathematical and trigonometric processing to derive the angle of arrival value. The system therefore is able to operate with a minimum number of antenna sensors, can accommodate reasonable frequency-dependent tolerances of the antennas, utilizes narrow bandwidth receiver front-end components, is not sensitive to component tolerances, and determines the angle of arrival by frequency domain processing utilizing front-end analog filters whose outputs are digitized with relatively slow high resolution (high dynamic range) analog to digital converters. The second angular dimension is determined by comparing the computed time difference of arrival with the computed spectral magnitudes.

SUMMARY OF THE INVENTION

A system and method for determining a direction of incident electromagnetic signals is provided that includes at least a pair of spaced antennas having overlapping fields of view for respectively receiving a transmitted signal. The system further includes at least a pair of receivers respectively coupled to the pair of antennas. Each of the receivers includes a spectral separator having a plurality of output signals. Each of the output signals represents a signal value at one of a plurality of predetermined frequencies. A plurality of analog to digital converters are coupled to a corresponding one of the spectral separators for respectively providing a digital representation of each of the output signals. The system includes a digital processor coupled to an output of each of the plurality of analog to digital converters for calculating an angle of arrival of the transmitted signal from the digital representations of the output signals from the spectral separators.

From another aspect, a method for determining a direction of incident electromagnetic signals includes the steps of:

a. receiving a transmitted signal at each of at least two antennas to provide at least a first radio frequency signal and a second radio frequency signal;

b. demodulating and spectrally dividing the first radio frequency signal to provide a plurality of analog first output signals respectively corresponding to signal values at different ones of a plurality of predetermined spectral locations;

c. demodulating and spectrally dividing the second radio frequency signal to provide a plurality of analog second output signals respectively corresponding to signal values at the different ones of the plurality of predetermined spectral locations;

d. converting the plurality of analog first and second output signals to a plurality of first and second digital representations thereof; and, e. calculating an angle of arrival of the transmitted signal from the first and second digital representations of the analog first and second output signals.

From yet another aspect, a method for determining a direction of incident electromagnetic signals is provided which includes the step of receiving a transmitted signal at each of at least two spaced apart antennas having overlapping fields of view to provide at least a first radio frequency signal and a second radio frequency signal. The method includes the step of coupling the first radio frequency signal to a first plurality of receivers. Each of the first plurality of receivers has a respective bandwidth less than a signal bandwidth of the transmitted signal and center frequency offset from the others of the first plurality of receivers to establish a plurality of analog first output signals. The method includes the step of coupling the second radio frequency signal to a second plurality of receivers. Each of the second plurality of receivers having a respective bandwidth less than a signal bandwidth of the transmitted signal and a center frequency offset from the others of the second plurality of receivers to establish a plurality of analog second output signals. The method includes the step of converting the plurality of analog first and second output signals to a plurality of first and second digital representations thereof. Still further, the method includes the step of calculating an angle of arrival of the transmitted signal from the first and second digital representations of the analog first and second output signals.

DESCRIPTION OF THE PREFERRED EMBODIMENTS

Referring now to FIGS. 1–11, there is shown system 100, 100' for determining a direction of incident electromagnetic signals. As will be seen in following paragraphs, system 100, 100' is specifically directed to the concept of accurately determining the angle of arrival (AOA) of an incident radio frequency (RF) signal that may then be used, in military applications, for defensive and offensive purposes. The method of deriving the AOA in system 100, 100' utilizes an analog approach to providing spectral separation of the incident signal prior to being digitized. That arrangement has the advantage of providing narrow band frequency-domain data for a plurality of "spectral points" using inexpensive high-amplitude-resolution analog to digital converters with a sampling rate that is a small fraction of that required by conventional systems.

Figure 1:
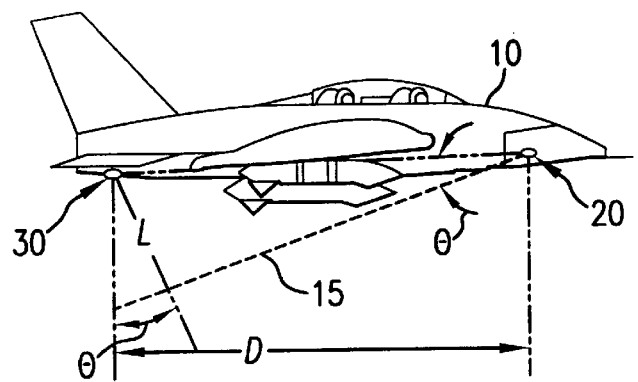
FIG. 1 is an elevation view of an aircraft showing RF sensor antennas locations on a starboard side of the aircraft.
Figure 2:
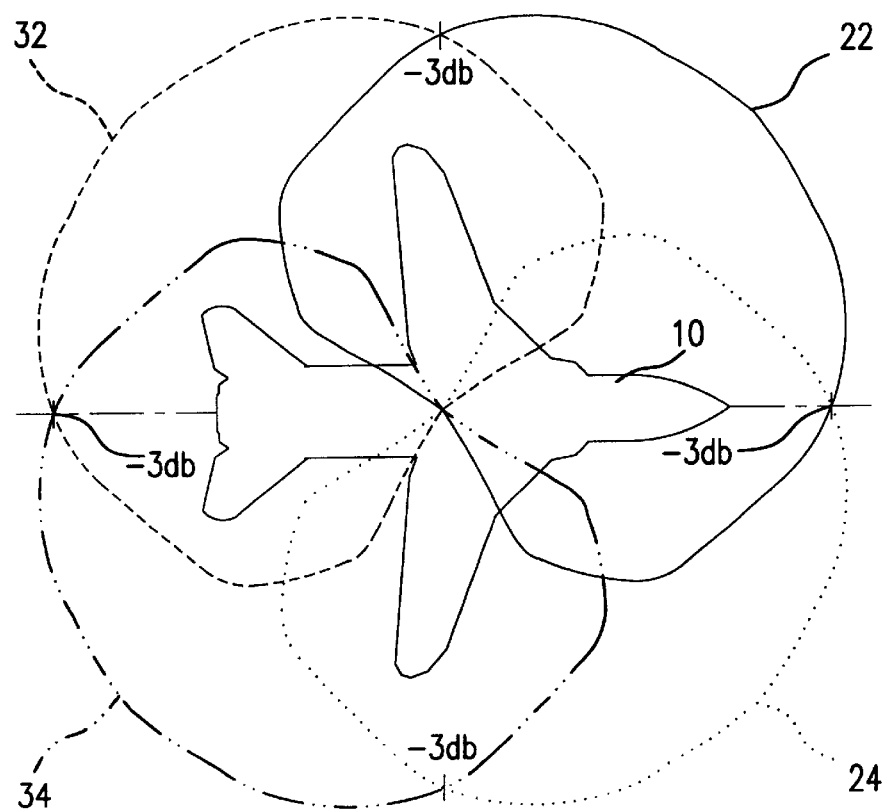
FIG. 2 is a diagram illustrating the antenna patterns of the RF sensor antennas of an exemplary aircraft.

In FIG. 1, there is shown, a typical antenna installation for use in AOA measurement on the military aircraft 10. The antennas 20, 30 are longitudinally spaced on the aircraft 10, a respective pair of antennas 20, 30 being symmetrically located on both port and starboard sides of aircraft 10. Thus, the starboard side view of FIG. 1 is representative of the port side antenna locations as well. The antennas 20, 30 have overlapping fields of view, as do the pair of antennas 20 at the forward end of aircraft 10, and antennas 30 at the aft end of aircraft 10, as shown in FIG. 2. FIG. 2 illustrates typical antenna gain patterns for radio frequency (RF) sensing applications on current aircraft (side-lobe gain is not illustrated for simplicity). The combination of antenna patterns 22 for the port forward beamwidth, 32 for the port aft beamwidth, 24 for the starboard forward beamwidth, and 34 for the starboard aft beamwidth, provides 360 degree azimuth coverage. The four quadrant antennas have considerable beamwidth overlap at gains less than −3 dB, however, additional antennas can be added.

Figure 3:
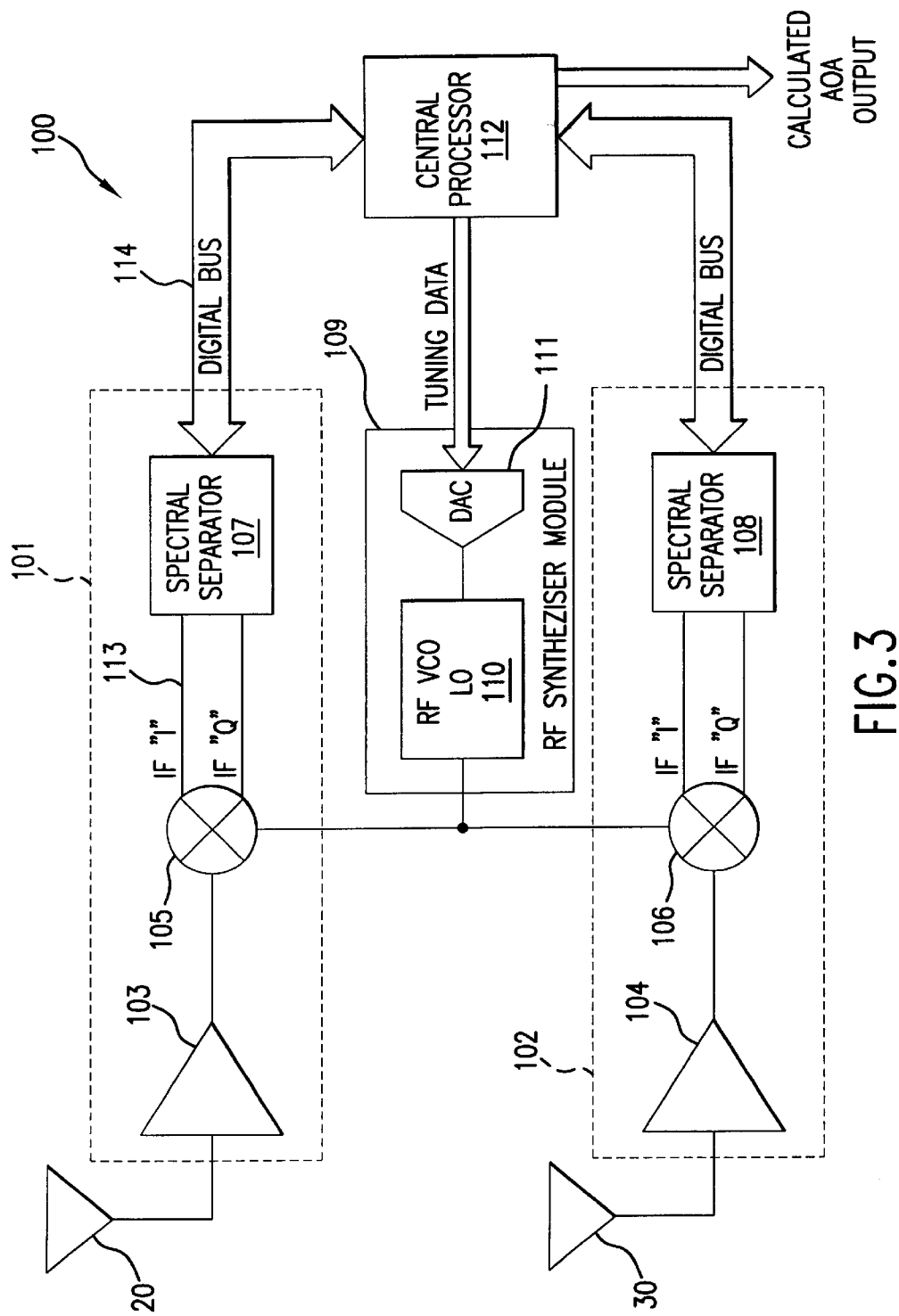
FIG. 3 is a block diagram of an angle of arrival determining system of the present invention.

As signals from only two antennas are required for the novel AOA measurement described herein, and to simplify the drawings, only the systems associated with a pair of antennas is shown. The particular pair of antennas being the two antennas receiving corresponding signals having the greatest magnitude. The systems associated with each antenna are identical. Referring now to FIG. 3, there is shown an overall system block diagram for the system 100 for determining a direction of incident electromagnetic signals. When an RF wave is intercepted by antenna 20 and by antenna 30, the received signals are respectively coupled to the RF preamplifiers 103 and 104. The amplified signals output from each RF preamplifier 103, 104 are coupled to a corresponding quadrature mixer 105, 106 of a respective receiver 101, 102. The quadrature RF mixers 105 and 106, are four-port devices, the ports being: RF in, LO in, IF "I" out and IF "Q" out. The designations "I" and "Q" represent "real" and "imaginary" components of complex numbers. The "I" and "Q" IF output ports of each mixer 105, 106 supply intermediate frequency (IF) signals to a respective spectral separator 107, 108. The spectral separators 107, 108 output signal values corresponding to predetermined frequencies around a center tuning frequency of the receivers 101, 102 to central processor 112. Each spectral separator 107, 108 provides an analog conversion of the received signal into one of several frequency domain representations thereof, which are then digitized to accommodate flexible subsequent processing. Central Processor 112 performs the calculations necessary to output the AOA Output, as will be described in following paragraphs.

The LO input port of each RF mixer 105, 106 is driven by a local oscillator (LO) in the form of RF synthesizer module 109. Such synthesizers are tuned by input of digital control signals from central processor 112. Alternately, a separate receiver control processor may be used to control local oscillator frequency output from RF synthesizer module 109. Although not important to the inventive concepts defined herein, one way to fabricate a synthesizer module 109, as shown, is by using a voltage controlled RF oscillator (VCO) 110 driven by a digital to analog converter (DAC) 111. The DAC 111 receives a digital tuning "word" from processor 112 and converts it to a voltage of predetermined magnitude. The voltage output from DAC 111 tunes VCO 110 to a predetermined frequency. The LO's tuned frequency is identical to the receiver's center-frequency tuning. The analog receiver 101 associated with antenna 20 consists of devices 103, 105, 107 and 109, while the analog receiver 102 associated with antenna 30 consists of devices 104, 106, 108 and 109. The RF LO 109 is shared by all receivers 101, 102. The central processor 112 in addition to controlling the LO 109, processes both receiver outputs in a coordinated fashion to generate the final desired AOA measurement output.

The function of the antenna 20, 30 is to intercept a portion of the incoming RF radiation. The RF preamplifier 103, 104 has two interrelated functions: to enhance the signal amplitude and to preserve the signal to noise ratio, as much as economics permits. The function of the mixer 105, 106 is to "beat" (demodulate) the input RF signal with the LO signal, thereby producing an IF signal that is much easier to process. The "beat" function is similar to the mathematical function of multiplying, and the multiplication of two sinusoids results in sum- and difference-frequency sinusoids, the difference-frequency term being the desired IF signal. In the configuration shown, the mixer is a quadrature mixer (two mixers in a single package) where the second mixer has an LO input signal with a ninety degree phase shift with respect to the LO signal input to the first mixer. Using a quadrature mixer allows an input signal with a frequency above the LO frequency to be distinguished from an input signal with a frequency below the LO frequency, even though the (absolute value of the) IF frequency is identical. The function of the LO 109 is to generate a pure sinusoid tone at the programmed RF carrier frequency.

Figure 4:
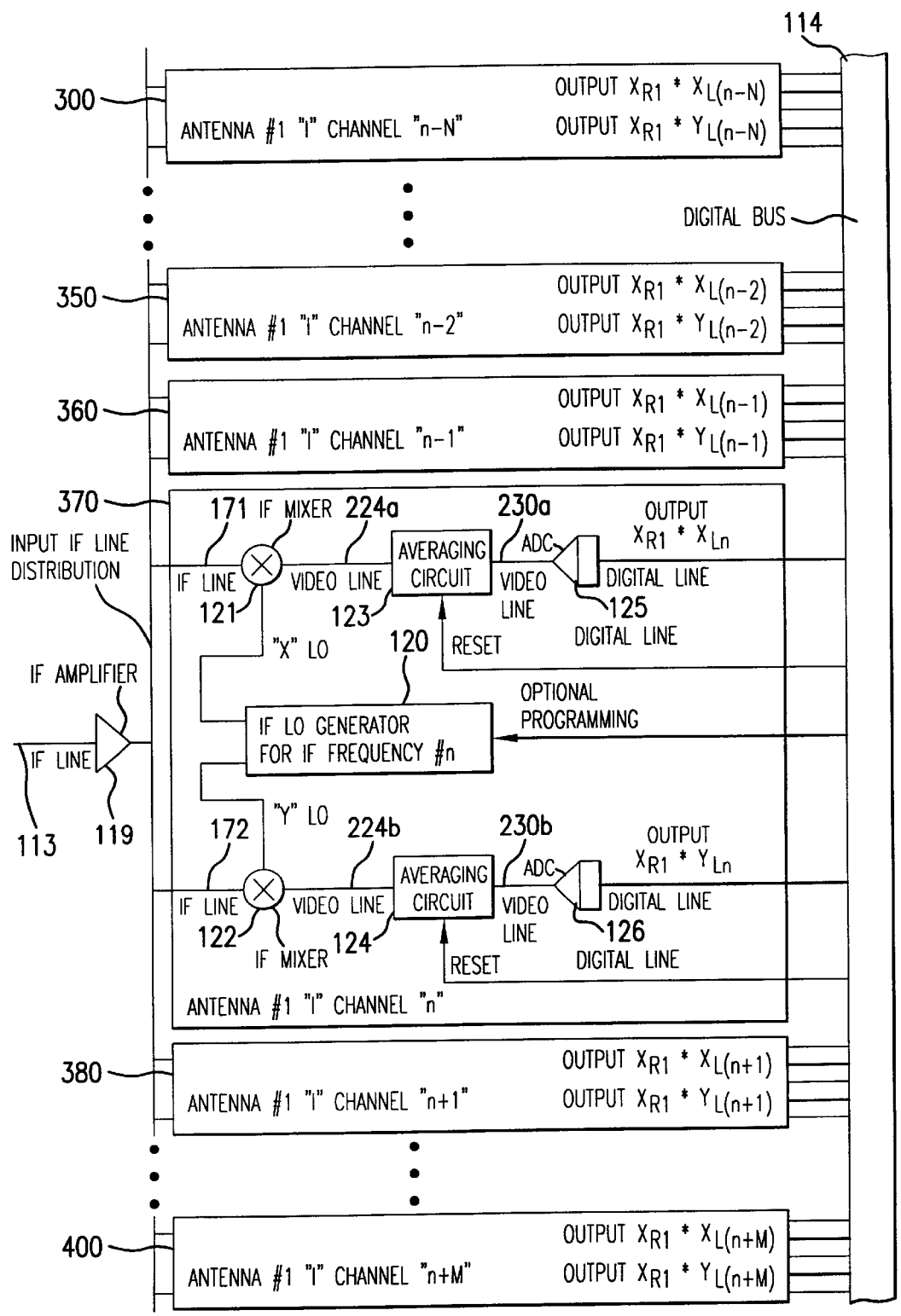
FIG. 4 is a block diagram of a spectral separator for the real portion of an IF signal of the present invention.

Referring additionally to FIG. 4, a block diagram of one half of the (Quadrature) spectral separator 107 of FIG. 3 is shown, the half associated with the IF "I" input line 113. The half associated with the IF "Q" input is identical and thus not shown for simplicity. The structure of spectral separator 108 is identical to that shown for spectral separator 107. The IF input, line 113 is input to an IF amplifier 119, and is distributed to a multiplicity of identical channels, the accuracy and precision of the frequency domain representation being a function of the number of channels used. However, a minimum number of channels is required to divide the received signal bandwidth into segments of less than 3 MHz, to provide sufficient accuracy. Therefore, the bandwidth of each channel 300, 350, 360, 370, 380, and 400 must be less than 3 MHz. Channels 300, 350, 360, 370, 380 and 400 are depicted to represent N+M+1channels, where N and M are integers. Generally, a larger number of channels makes the system more flexible and accurate, albeit at increased expense. The output from each of these channels is converted to a digital format and transmitted over the output bus 114. Digital bus 114 may be a single serial or parallel transmission path shared by a plurality of channels. Alternately, the digital communication between each channel and the central processor 112 can be carried out by separate dedicated serial or parallel communication lines. The digital signals associated with a given channel are designated as a product of two numbers, each represented by the form $V_{Ek}$, where V is either X for a real value ("I" component) or Y for the imaginary value ("Q" component); E is either R for the antenna signal input or L for the IF LO signal input; and k designates the antenna as either 1 (antenna 20) or 2 (antenna 30) when E=R, or the channel number when E=L. These designations represent the "beat" of the IF signal by a second channel-specific LO.

Looking at the details of the channel structure of channel 370, each of the two paths 171 and 172 input to the channel 370 is respectively coupled to an IF mixer 121, 122. The output of each mixer 121, 122 is connected to a respective averaging circuit 123, 124, each averaging circuit 123, 124 in turn providing an output to an analog to digital converter (ADC) 125, 126. The digital output of each ADC 125, 126 is coupled to the output bus 114. Each mixer 121, 122 is a three-port device, with an IF input, an IF LO input and a video signal output. The two IF mixers 121 and 122 together form a quadrature pair functionally similar to the RF mixer 105, 106 of FIG. 3. To accomplish the quadrature beat, the LO signal input to the second IF mixer 122, has a ninety degree phase shift compared to the LO signal input to the first mixer 121. The IF LO 120 is programmable and functionally similar to the RF LO 109 of FIG. 3.

The IF amplifier 119 functions similarly to RF amplifier 103, 104, although the hardware technology is considerably different because IF signals (lower frequency) are being processed instead of RF signals (higher frequency). The IF amplifier 119 must have a sufficient power rating to drive the ADCs to full scale under the full load of all of the channels, e.g., blocks 300, 350, 360, 370, 380 and 400, and the insertion loss of the intervening components, e.g., mixer 121 and averaging circuit 123 or mixer 122 and averaging circuit 124.

Figure 5A:
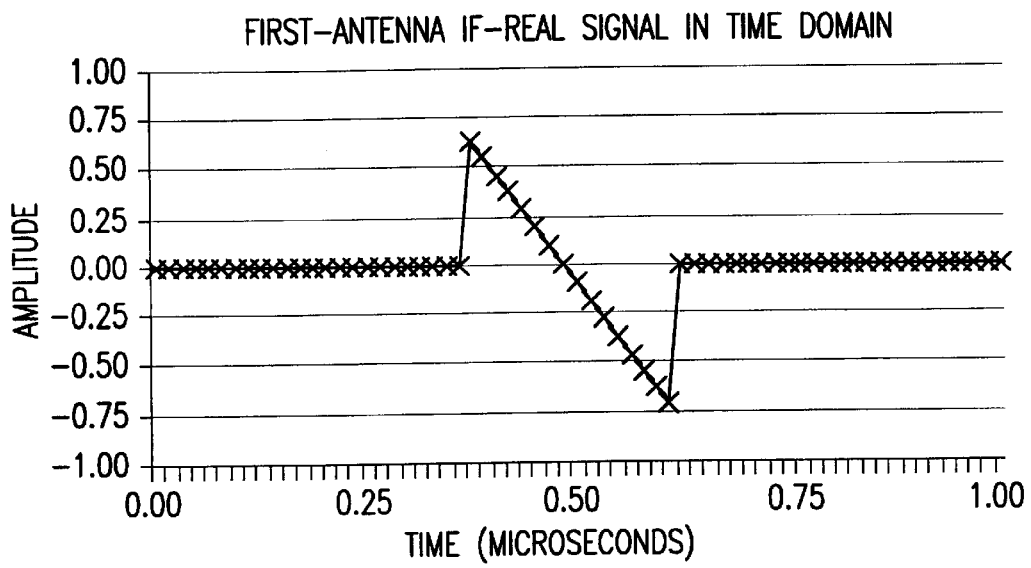
FIGS. 5A and 5B are graphical representations of the intermediate frequency, real component, signal for each of two of the sensor antennas of the present invention.
Figure 5B:
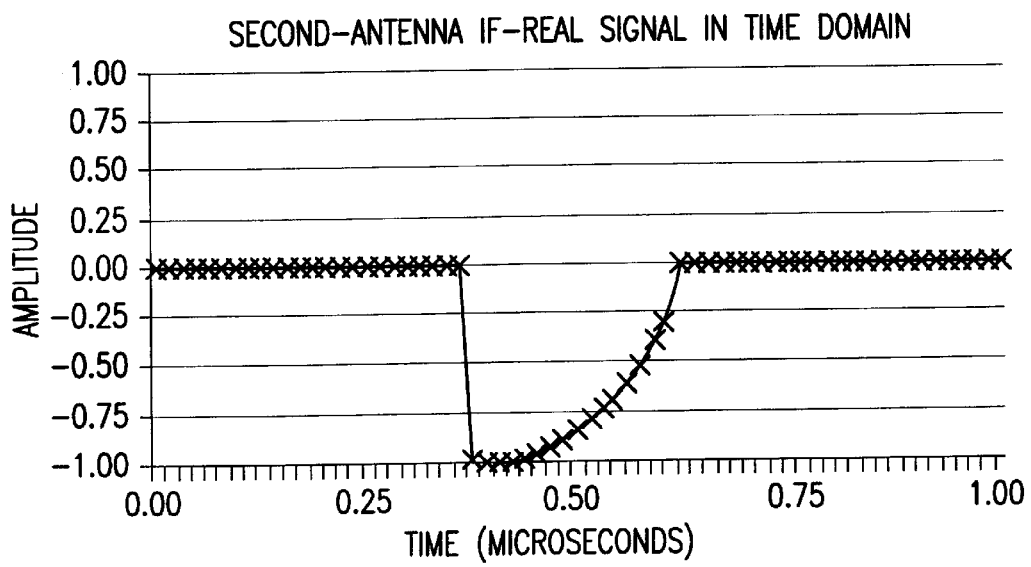
Figure 5C:
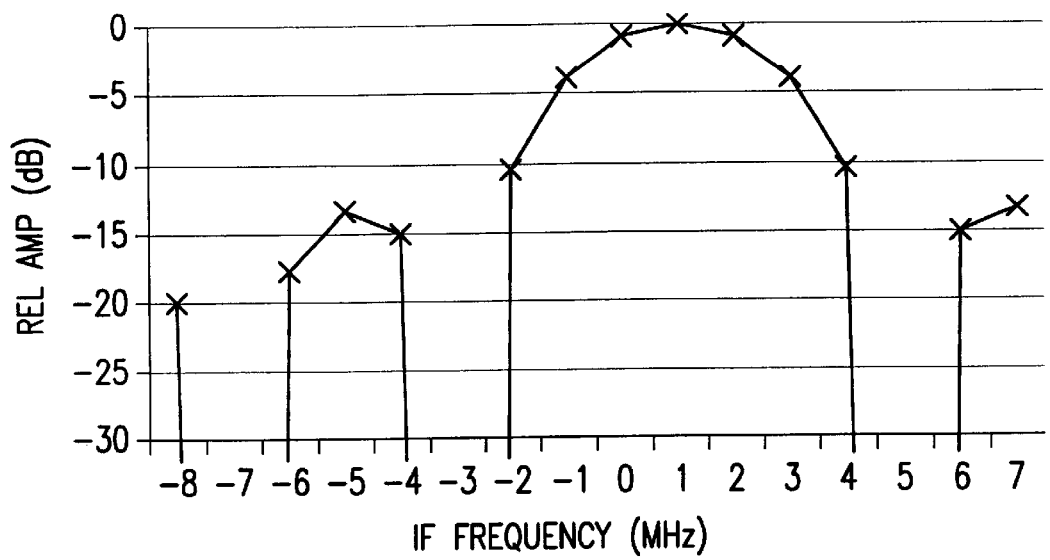
FIGS. 5C and 5D are graphical representations of the intermediate frequency magnitude signal in the frequency domain that are derived from the signals received by two sensor antennas of the present invention.
Figure 5D:
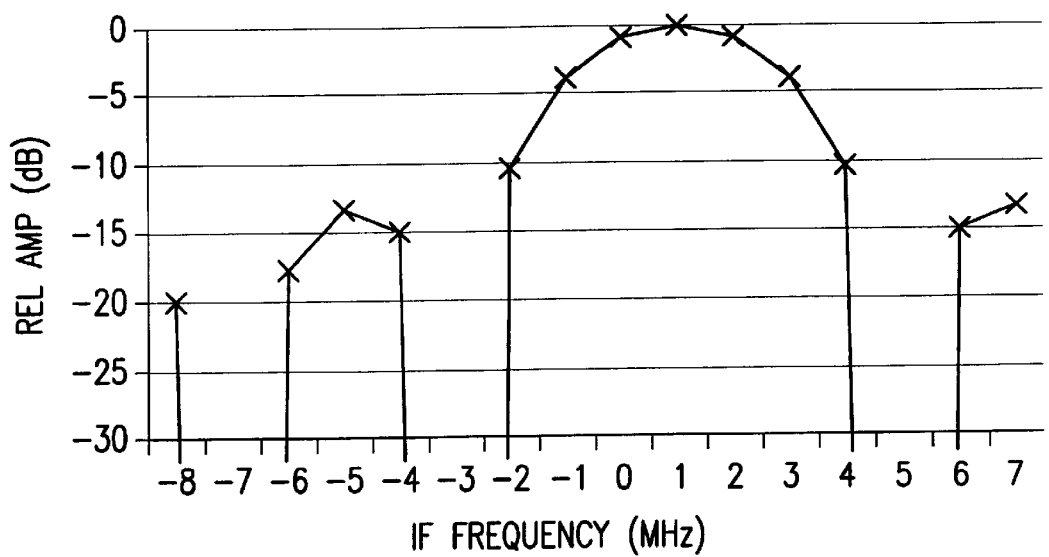
Figure 5E:
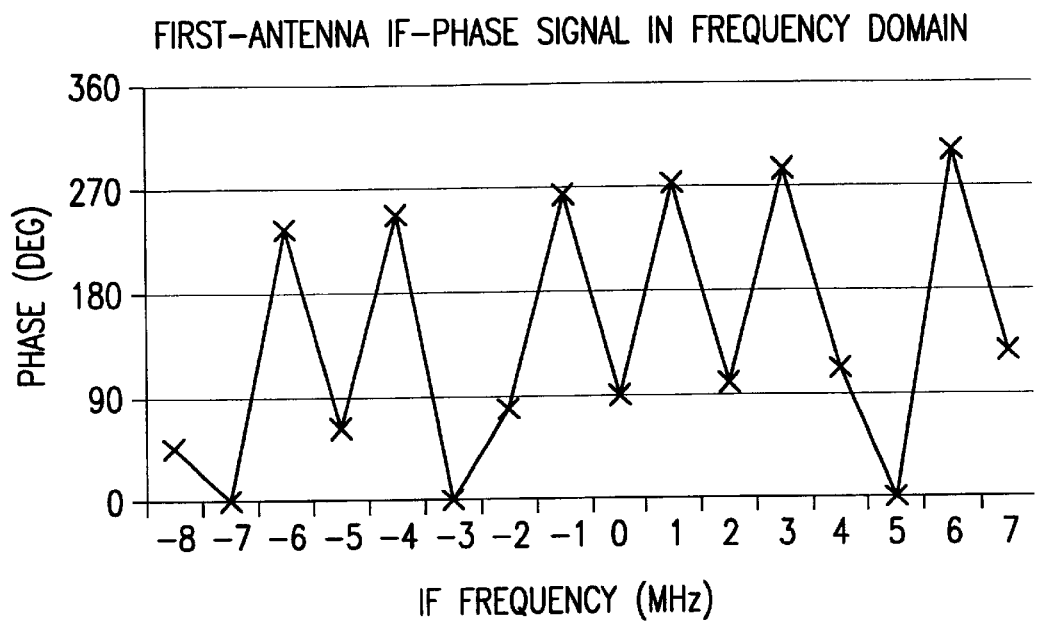
FIGS. 5E and 5F are graphical representations of the intermediate frequency phase signal in the frequency domain for each of the signals received by two sensor antennas of the present invention.

Mixer 121, 122, functions to beat the input IF signal to an even lower frequency, hence its output is herein designated as a video signal. A typical IF input to the mixer 121, 122 is illustrated in FIG. 5A, and the typical IF input to a corresponding channel for the second antenna is illustrated in FIG. 5B. The programming of the channel LO 120 selects a frequency within the receiver bandwidth. In fact, the receiver bandwidth is defined by the range of frequencies of channel LO. The example shown in FIG. 5C and 5E is for a 16 channel system, 16 points being computed for the spectrum, as can be seen. The function of each channel, such as channel 370, is to compute a point in the frequency spectrum, such as the points in FIG. 5C and 5E. The term "point" is actually the average signal over a predetermined bandwidth, rather than at a single frequency. If the channel frequencies are equally spaced, as shown in FIG. 5C and 5E, then the channel bandwidths would approximately equal the channel frequency spacing.

The function of the averaging circuit 123, 124 is to determine the average value of the video signal input thereto on lines 224a, 224b, and this average is designated at the nominal value of the spectrum for the programmed frequency. Thus, the mixer 121, 122 establishes the center frequency of the spectral segment being processed, and the corresponding averaging circuit 123, 124 establishes the bandwidth of the spectral segment (channel). Accordingly, the hardware of each of the channels is identical, with only the local oscillator frequencies being different from one channel to another. The averaging circuits 123 and 124 each have a video output 230a, 230b that is digitized by the ADCs 125 and 126, respectively. The averaging circuits 123 and 124 each act as an analog computer to compute the Cartesian components of the programmed portion of the spectrum, while the values shown in FIG. 5C and FIG. 5E are in polar format. That is, the first averaging circuit 123 computes the "I" or real component of the spectrum for the programmed frequency, and the second averaging circuit 124 computes the "Q" or imaginary component of the spectrum for the programmed frequency. FIG. 5C shows the set of sixteen magnitude values and FIG. 5E shows the set of sixteen phase values.

For example, if the RF LO 109 has been programmed for 5000 MHz, and the IF LO 120, in channel 370, associated with antenna 20, has been programmed for 2 MHz, then the first averaging circuit 123, will output the first antenna's real component, and the second averaging circuit 124, will output the first antenna's imaginary component, for the portion of the first antenna's spectrum around 5002 MHz. The quadrature processing structure allows a LO of 2 MHz, programmed for IF LO 120, to be used to unambiguously distinguish the RF wavefront spectrum at 5002 MHz from 4998 MHz.

With respect to the graphs of FIG. 5, such represent the conditions shown in FIG. 1, where the antennas are spaced thirty feet apart (distance D), the incident RF wavefront 15 has an AOA of 11.2 degrees, and the intercepted RF signal has a pulse width of a quarter microsecond, a carrier of 5001 MHz and a carrier phase of 45 degrees. The conventional definition of a signal's phase is the phase at zero time. Here, time zero is defined as the beginning of a "look" or gating window, which is the full abscissa scale of FIGS. 5A and 5B. Receivers and processors are used to generate these windows at the expected approximate time of arrival (TOA) of the pulse. The window generation is a desirable but not a necessary part of the instant invention. It is desirable because it gates out noise and interfering signals, thereby improving the receiver sensitivity. The window gating has identical timing for both antennas. In the example shown, the window is one microsecond long and starts 0.36 microseconds before the leading edge of the pulse intercepted by the first antenna.

Just before the beginning of the window the receivers are tuned to the expected carrier frequency, so that noise and interfering signals may be filtered out. The tuning of agile receivers to coincide with an unknown carrier frequency of an incident signal is well known in the art and not described herein. The receiver passes only signals near the LO frequency, thereby improving sensitivity. In the examples of receivers shown herein, homodyne receivers are used, so the tuned receiver's RF carrier center frequency is the LO frequency, however, superhetrodyne receivers can also be used. In the example shown, the local oscillator is set to 5000 MHz, which results in an acceptably-low one MHz offset error from the true signal carrier frequency. As previously discussed, the tuning of the receiver's LO 109 can be controlled by a dedicated controller or under control of processor 112. The error offset from the true carrier frequency (in this example 1.0 MHz) could be the result of errors when the signal's frequency was first measured (on previous pulses), or it could result from a miscalibrated LO, or it could result from coarse LO tuning resolution, or it could be the result of a combination of these and other factors. The "beat" of the LO and RF input signal results in the intermediate frequency signal illustrated in FIG. 5A for the first antenna 20 and FIG. 5B for the second antenna 30. The resulting IF is one MHz and, as shown, there is less than a full cycle of the IF sinusoid for the quarter microsecond pulse duration, since a one MHz sinusoid takes a microsecond to complete a full cycle. If the LO tuning had been more accurate there would be even less than the quarter cycle of the sinusoid within the pulse width.

For simplicity of this example, gain and phase differences between the two paths resulting from the antenna and other component tolerances are assumed to be zero. The LO phase is also assumed to be zero. If the incident AOA were zero degrees, the wavefront 15 would strike both antennas simultaneously and both FIG. 5A and FIG. 5B waveforms would be identical. Since, in this example, the AOA of the wavefront is 11.2 degrees, the wavefront 15 strikes the second antenna later than the first, as illustrated in FIG. 1. The resulting difference in the start of the two IF waveforms is imperceptible in FIGS. 5A and 5B because the speed of electromagnetic radiation is so fast. However, there is a dramatic difference in the phase between the two antenna's intercepts shown in FIGS. 5E, 5F, and 5G. That is because the path-length difference "L," shown in FIG. 1, is many wavelengths long. Specifically, the extra propagation time is 0.0059 microseconds while each carrier cycle is about 0.0002 microseconds, giving a difference of twenty nine and a fraction wavelengths. The fractional portion of the difference accounts for the phase differences between the IF waveforms in FIGS. 5A and 5B. The integer portion of the difference accounts for the ambiguity of AOA measurements that rely on phase differences. Note that the "beat" between the intercepted RF signal and the LO waveform simply passes the RF carrier phase to the IF sinusoid phase. The equation for the phase difference "α" (alpha) is:

$$\alpha = 2\pi FD \sin(\theta)/c \tag{1}$$

where,
  θ=AOA with respect to a reference line normal to the aircraft's surface,
  π=3.141592654 . . . ,
  F=frequency,
  D=distance between the antennas,
  c=speed of light.

Equation (1) is derived from the rule that phase is proportional to the product of frequency and time delay, with the constant of proportionality depending on whether phase is measured in radians, degrees or wavelengths.

Figure 5F:
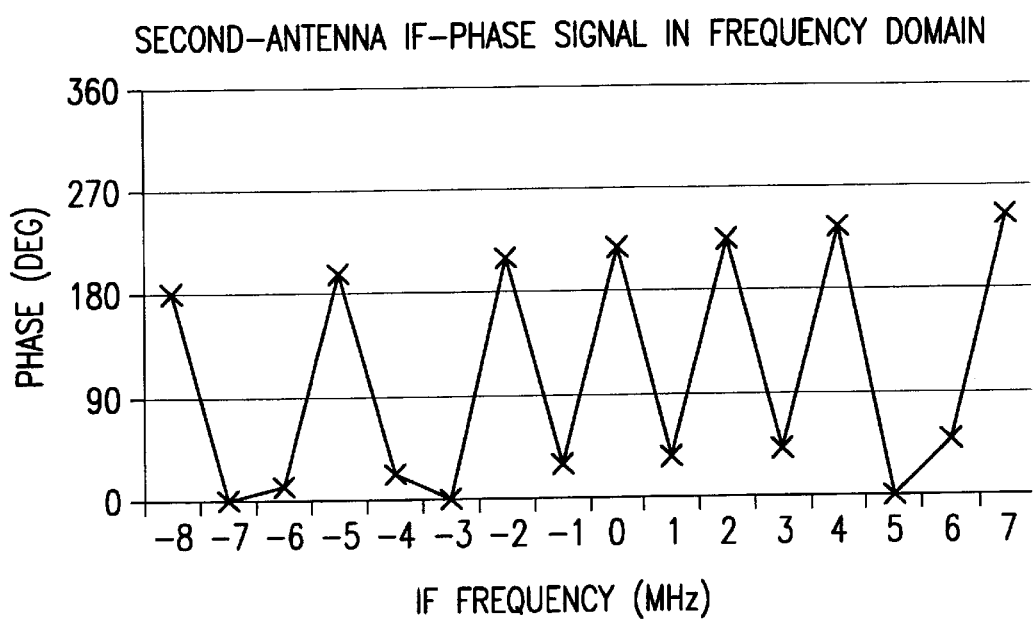

FIGS. 5A and 5B are time domain representations of the intercepted RF signals after conversion to the intermediate frequency. FIGS. 5C and 5E show the transformation of the first antenna's IF input to the frequency domain, while FIGS. 5D and 5F show the transformation of the second antenna's IF input to the frequency domain. As previously discussed, the receiver hardware will generate two or more spectral components of the input IF signal, real and imaginary, while the representations in FIGS. 5C, 5D, 5E and 5F waveforms are mathematical transformations of the IF input signals whose real components are shown in FIG. 5A and FIG. 5B, the imaginary components would be the identical sinusoids, albeit shifted ninety degrees. The transform mathematics, based on Fourier's work, is well known in the art and will not be described herein. Suffice it to say that every signal can be represented by informationally-equivalent time-domain waveforms or frequency-domain waveforms. Although the information is equivalent in either form, the information is usually more convenient for a given application in one of the forms than the other. The illustrated IF signals contain enough information to unambiguously determine the AOA of the incident RF wavefront, and that information can be extracted using the systems and methods described herein.

The receiver will beat the LO against the RF input in quadrature in the preferred embodiment, generating "complex-number" waveform values. Complex-signal waveforms, whether in the time domain or frequency domain, are conventionally shown in either the informationally-equivalent Cartesian or polar representations. The Cartesian components are the real or "I" component and the imaginary or "Q" component. The time-domain representation of the real components of the two IF inputs are shown in Cartesian coordinates in FIGS. 5A and 5B. The polar components are the magnitude component and the phase component. The frequency domain representation of the two IF inputs are shown in polar coordinates in FIGS. 5C, 5D, 5E and 5F. Specifically, the magnitude components are shown in FIG. 5C and FIG. 5D for the first and second antennas respectively, and the phase components are shown in FIG. 5E and FIG. 5F for the first and second antennas, respectively. The systems and methods of the instant invention are more easily explained using the polar representation.

It should be noted that the frequency domain's magnitudes for the IF signals associated with antenna 20 and antenna 30 are identical, as can be ascertained by comparing FIG. 5C and FIG. 5D. Therefore, for AOA-determination purposes, there is no useful information in the magnitude components. Consequently, the time-difference information cannot be in the frequency-domain magnitude representation, in FIG. 5C and FIG. 5D. However, the frequency domain's phases for the IF signals associated with antenna 20 and antenna 30 have significant differences, as can be ascertained by comparing FIG. 5E and FIG. 5F. Furthermore, close inspection of the figures will reveal that the differences vary as a function of frequency. Since the signals associated with both antennas are identical except for the time delay difference, using time-domain terminology, that must mean that the time-delay value must be the sole cause of these frequency domain phase differences. That must be true because 1) all the representations discussed here (i.e., Cartesian time, polar time, Cartesian frequency and polar frequency domains) are informationally equivalent, and 2) if the information is not in one component it must be exclusively in the other component. Here, the information of interest is the time delay difference between the two antennas. And if the time difference is known, then the AOA can readily be computed. Thus, the information needed to determine the time delay difference value, and hence determine the AOA value, must reside exclusively in the pattern of differences in phase values between the phase components of the polar representation of the frequency domain representation of the IF signals associated with antenna 20 and antenna 30 shown in FIG. 5E and FIG. 5F respectively. That is the basis for the mathematical derivation as follows (continuing from equation 1):

$$d(\alpha) = \frac{2\pi D \sin(\theta)}{c} dF \qquad (2)$$

where, d(α)=ΔRF phase, and dF=Δ carrier frequency=spectral line spacing.

$$dF = \frac{c}{2\pi D \sin(\theta)} d(\alpha) \qquad (3)$$

$$MdF = \frac{c}{D \sin(\theta)} \qquad (4)$$

where MdF=maximum allowed spectral line spacing before phase-slope result becomes ambiguous.

$$S = \frac{d(\alpha)}{dF} = \frac{2\pi D \sin(\theta)}{c} \qquad (5)$$

where S=phase slope with respect to frequency for a given D and $$\theta = \sin^{-1}\left(\frac{cd(\alpha)}{2\pi D(dF)}\right) = \sin^{-1}\left(\frac{c}{2\pi D} \frac{d(\alpha)}{dF}\right) \qquad (6)$$

In some applications, the time-difference-of-arrival (TDOA) is needed. In particular, following paragraphs will show how the AOA is determined in two dimensions, and that determination needs the TDOA as an input for its processing. Equation 7 uses the Equation 6 result or the result of Equation 5 to determine the TDOA.

$$TDOA = \frac{L}{c} = \frac{D \sin(\theta)}{c} = \frac{S}{2\pi} \qquad (7)$$

Figure 6A:
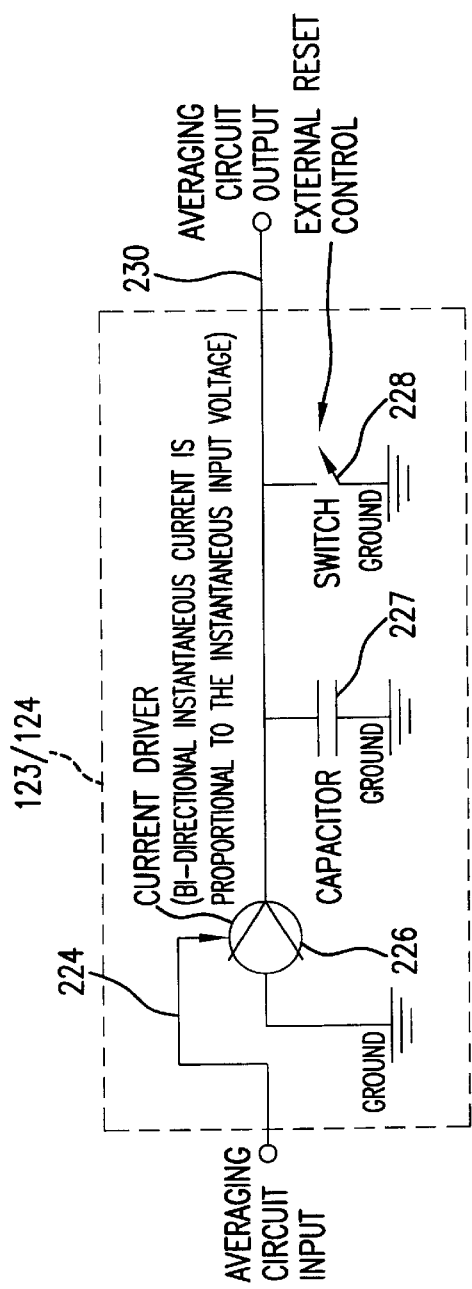
FIG. 6A is a schematic diagram of an averaging circuit of the present invention.
Figure 6B:
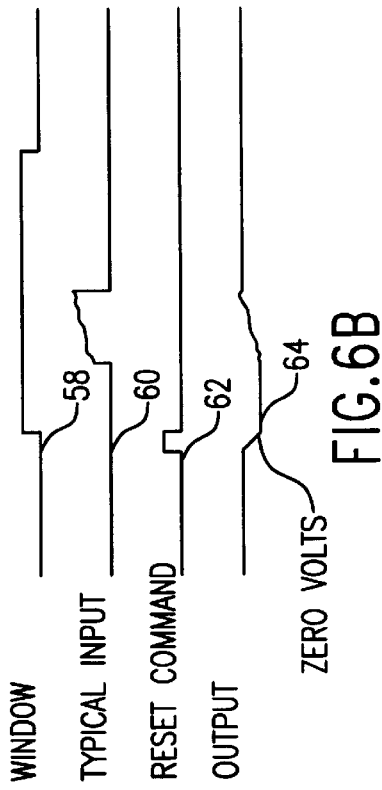
FIG. 6B is a set of waveform diagrams associated with the averaging circuit of FIG. 6A.

FIG. 6A shows a schematic representation of the averaging circuit 123, 124 of FIG. 4, with associated exemplary waveforms shown in FIG. 6B. The function of circuit 123, 124 is to determine the average of the video input voltage, waveform 60, during a gating window, waveform 58. The average is computed in analog fashion by integrating the bipolar video input, waveform 60, to get the integral result, waveform 64. In conformity to the definition of an integrator, the voltage on the capacitor 227, increases when the input is positive, remains the same when the input is zero (such as when the input pulse is not present), and decreases when the input is negative (a condition not shown). Just prior to the beginning of the window for which the voltage is to be averaged, there is a reset command provided from central processor 112 through the digital bus or other coupling line, waveform 62, that discharges the voltage accumulated during the last measurement (plus any drift in the intervening time resulting from non-ideal operation) by utilizing a switch 228. Switch 228 may be a mechanical or electronic switch. As shown, input video voltage, waveform 60, drives a linear bipolar current driver 226. This causes charge to accumulate on the capacitor 227, in a linear fashion. The resulting accumulated charge results in a voltage, waveform 64, that depends on the value of the capacitor 227. The integration result output on line 230 is captured by the ADC 125, 126 by starting its conversion at the end of the window, waveform 58. That is, the desired integral output value is the voltage on capacitor 227, remaining at the end of the window time period, waveform 58.

The signal's input frequency to the averaging circuit 123, 124, is the result of combining the intercepted propagating wave signal frequency with the frequency of the RF LO 109, and the frequency of the IF LO 120, for example. If the resultant frequency happens to be high, so that there are several cycles of the sinusoid within the pulse width, then the integration result will be a relatively low output since the input's positive durations will be approximately canceled by the input's negative durations. Indeed, the nulls in FIG. 5C and FIG. 5D are for frequency cases where the input to the integrator has an integer number of cycles which result in a null-integration result. The example shown in FIG. 6B is for a pulsed-signal input to the averaging circuit with a frequency that has a period much longer than the pulse width, which would be typical of spectral points near the spectral main lobe peak in FIG. 5C or FIG. 5D. The design shown in FIG. 6A provides a true-integration process. There are numerous potential variations to this circuit that can be used to implement a suitable averaging circuit without departing from the inventive concepts embodied herein. In a simpler version, that can give a reasonable approximation of an idealized integration if certain design rules are met, the current source 226 is replaced by a resistor.

Of critical importance, the analog processing of spectral separators 107, 108 provide frequency-domain data that is then digitized. The relatively long time scale illustrated in FIG. 6B for the averaging circuit allows the ADCs 125 and 126 to use relatively slow sampling rates, and hence are both inexpensive and accurate.

Central processor 112 processes the digitized spectral data to derive the angle of arrival value for the incident wavefront. The processing carried out by central processor 112 may be implemented with hardwired digital circuitry, firmware or software, or some combination of these implementation choices. In the following mathematical steps carried out by processor 112, the averaging circuit outputs supplied to processor 112 are designated as the product of two numbers, each in the form $V_{Ek}$, where V is either X for a real value ("I" component) or Y for the imaginary value ("Q" component); E is either R for the antenna signal input or L for the IF LO signal input; and k designates the antenna as either 1 (antenna 20) or 2 (antenna 30) when E=R, or the channel number when E=L.

(a) Computation of real component for spectral line "n" for first and second antenna inputs.

$$X_{1n} = X_{R1}*X_{Ln} - Y_{R1}*Y_{Ln} \quad (8)$$

$$X_{2n} = X_{R2}*X_{Ln} - Y_{R2}Y_{Ln} \quad (9)$$

(b) Computation of imaginary component for spectral line "n" for first and second antenna inputs.

$$Y_{1n} = X_{R1}*Y_{Ln} + Y_{R1}*X_{Ln} \quad (10)$$

$$Y_{2n} = X_{R2}*Y_{Ln} + Y_{R2}*X_{Ln} \quad (11)$$

(c) Computation of magnitude M for spectral line "n" for first and second antenna inputs.

$$M_{1n} = X_{1n}^2 + Y_{1n}^2 \quad (12)$$

$$M_{2n} = X_{2n}^2 + Y_{2n}^2 \quad (13)$$

(d) Computation of spectral line "n" phase difference between first and second antenna inputs, where the magnitude of equations 12 and 13 exceed predetermined minimum values.

$$\alpha(n) = \text{arctangent}(X_{2n}, Y_{2n}) - \text{arctangent}(X_{1n}, Y_{1n}) \quad (14)$$

(e) Computation of phase difference between two spectral lines, where the magnitude of equations 12 and 13 exceed predetermined minimum values.

$$d(\alpha(n)) = \alpha(n+1) - \alpha(n) \quad (15)$$

(f) Computation of phase slope $S_n$, using the result of equation 15, where $F_n$ and $F_{n+1}$ are RF carrier frequencies and where the magnitude of equations 12 and 13 exceed predetermined minimum values.

$$S_n = d(\alpha(n))/(F_{n+1} - F_n) \quad (16)$$

(g) Computation of $S_{nominal}$ from the individual $S_n$ values using statistical processing when N>2, such as by averaging or a weighted average, which is likely to be more accurate. Equation 17 shows a simple average using the channel designation conventions in FIG. 4 and assuming every channel meets the magnitude requirement described in following paragraphs.

$$S_{nominal} = (S_{n-N} + \ldots + S_{n-2} + S_{n-1} S_n + S_{n+1} \ldots S_{n+M-1})/(N+M) \quad (17)$$

The term $S_{N+M}$ is not included because it is undefined.

(h) Compute AOA using equation (6).

Figure 5G:
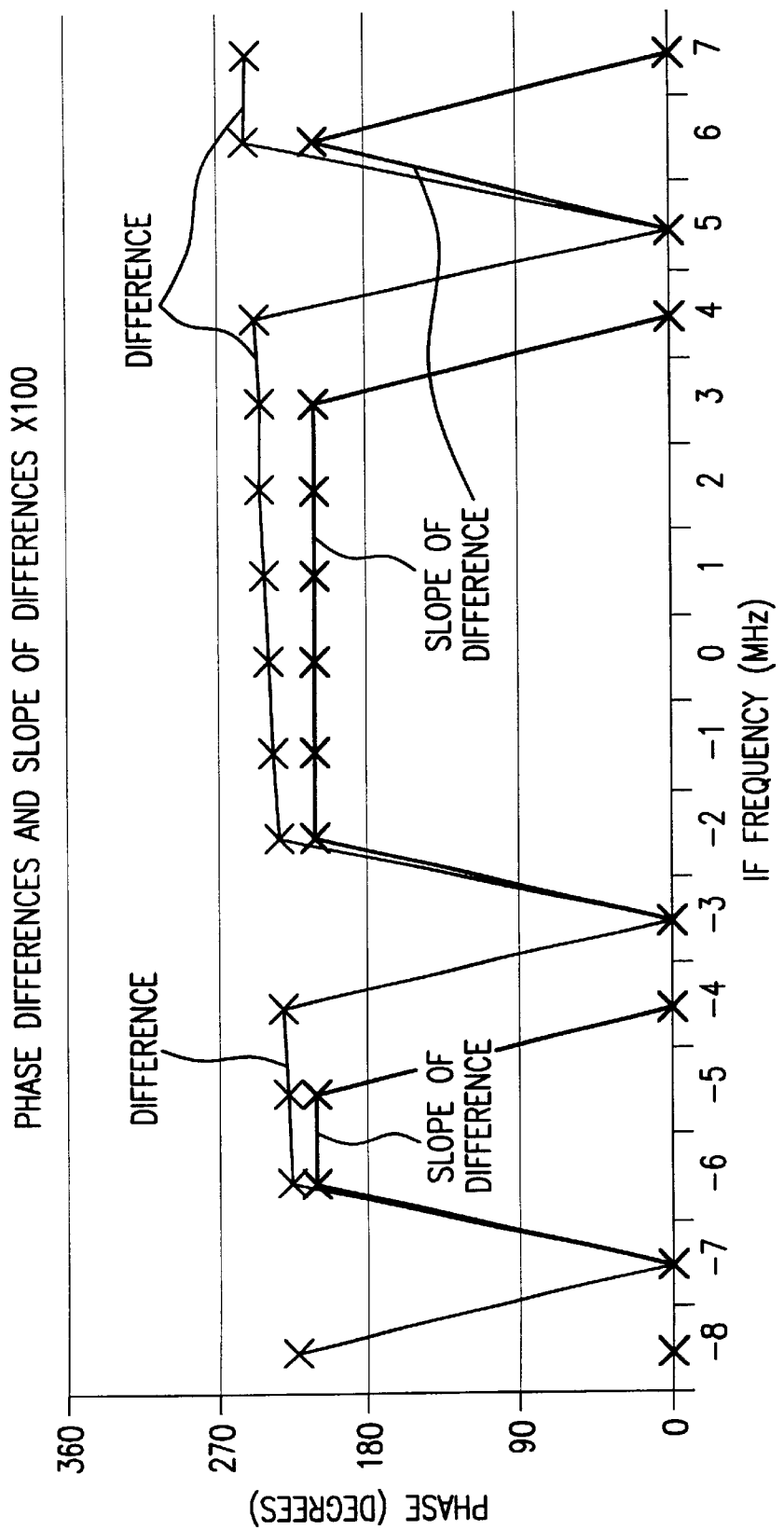
FIG. 5G is a graphical representation of the phase difference and slope of the difference for the intermediate frequency phase signals depicted in FIGS. 5E and 5F.

Equations 8, 9, 10 and 11 are readily seen to be the mathematical description of the product of complex numbers in Cartesian form. Equations 8 and 10 are associated with the first antenna while equations 9 and 11 are associated with the second antenna. The central processor 112 processing in equations 8, 9, 10 and 11 is simply the sum or difference of selected input terms, such terms being the digitized result of analog multiplication and integration, as explained above. The processing result, in equations 8, 9, 10, and 11, is the integral of the input IF signal multiplied by the nth IF LO frequency. The functional result is the frequency-domain description of the input signal. The computation of the magnitude, equation 12 for antenna 1 and equation 13 for antenna 2, corresponds to the example ordinate values in FIG. 5C and FIG. 5D, respectively, where the counter n in these equations identifies the common point along the abscissa in FIG. 5C and FIG. 5D. Equation 14 is the phase difference between antenna 1 and antenna 2 at a frequency identified by counter n which corresponds to an example point labeled "Difference" in FIG. 5G. The ordinate value of the points labeled "Difference" in FIG. 5G are simply the difference of the corresponding phase values in FIGS. 5F and 5E. That is, the processing needed to generate the "Difference" is shown graphically, for example values, in FIG. 5 and mathematically in Equation 15. Equation 15 shows the computation of the phase difference between spectral points, and Equation 16 shows the computation of the corresponding slope, and corresponds to the example points labeled "Slope of Difference" in FIG. 5G. This is the slope output, referred to as "S" and/or as "d(α)/dF" in equations 5. If there are more than two channels in the spectral separator, corresponding to more than two spectral points in FIG. 5G, the values need to be statistically combined to obtain the final result. Ideally, all the individual "Slope of Difference" values should be identical, as they are shown in the idealized example in FIG. 5G, however, there may be "real-world" phenomena, such as noise, which cause them to be unequal and justify more than two channels and the statistical combination processing. Statistical combination is a common and well known mathematical procedure; the simplest statistical combination procedure is simply to take the average of the points. The final processing step, step g, is the conversion of the slope value, equation 16, to the desired AOA value, "θ" (theta) in equations 5 and 6. The phase slope (the nominal phase difference change per unit frequency change) is proportional to the RF incident wave front time difference of arrival, and hence is monotonically related to the angle of arrival. The TDOA is derived in Equation 7.

As explained above, for an input with constant intra-pulse magnitude, as considered in the time domain, the corresponding magnitude will vary considerably when considered in the frequency domain. FIG. 5C and FIG. 5D show an example. The magnitudes at the nulls are nil. Therefore, the processing must discard spectral points that do not meet minimum magnitude requirements. That is a rationale to use more than two channels in the spectral separators, to account for uncertainty in the input signal's spectrum. The processing defined by equations 14–16 include the relational decision or test to perform the specified computation only when the corresponding spectral line magnitude is greater than a predetermined minimum value. That additional processing has as its goal the elimination of unsatisfactory spectral points. In FIGS. 5C and 5D those discarded points are defined as values below 30 dB below the peak value of the spectrum; the phase values for these discarded points are zeroed in FIG. 5E and FIG. 5F. The predetermined minimum magnitude value depends on both the level below the peak of the spectrum and the level above the noise floor. Generally, the amplitudes of the peaks of the input spectrum magnitudes will differ considerably if antenna 20 and antenna 30 do not have receiving patterns pointed in the same direction, as in the application shown in FIG. 2. So, the processing defined by equations 14, 15 and 16, for a channel or spectral point designated by "n," is only valid if the relational test, discussed above, for "n" is passed. This process is illustrated by making the invalid points zero in FIG. 5G. The "Slope of the Difference" graph line has more invalid points than the "Difference" graph line because the computation of each slope point requires two difference points. Therefore, it should be understood that the previously discussed statistical combination of slope values, such as by averaging, uses only valid points. The statistical combination of the pairs of values in equation 16 can be further improved by amplitude-weighting the individual values, using the magnitudes computed in equation 12 and equation 13.

For the application shown in FIG. 1, it has been shown that the amplitude intercepted by the antennas, 20 and 30 is not used directly, since, as shown in equations 14, 15 and 16, only phases are used for direct AOA computations. The amplitude only has an indirect impact, being used to ensure an adequate SNR for each point computed. Therefore, both the antenna gain differences with respect to the AOA of the incident signal, and the frequency-dependent gain differences associated with the antennas or other components, can be accommodated. Similarly, differences in phase between the antennas are not used directly for the AOA computations, as shown in equation 16, so first-order phase differences, whether caused by the antennas or the receivers front-end hardware, can be ignored. Second-order variations in phase across the frequency band may cause a significant error only to the extent that there are significant changes in the phase differences within the receiver's instantaneous bandwidth. Such second-order errors should be negligible because the receiver bandwidth is so much smaller than the operating bandwidth (e.g., 10 MHz out of 2000 MHz), assuming the variations only exhibit a few cycles within the operating bandwidth. Therefore, calibration for absolute accuracy is simple and straight forward.

As shown by equations 1–16, the processing in system 100 is independent of the receiver's center carrier frequency. The signal bandwidth, for the application of FIG. 1, is almost always less than 10 MHz for pure tone pulsed carriers. That is because the radar designer will select a pulse width compatible with the expected size of the aircraft to be tracked. Many of the aircraft of interest to military radars are on the order of fifty feet in length, so the tracking-radar designers choose pulse widths from 0.1 to 0.5 microseconds as the best compromise between resolution and sensitivity, while the search-radar designers choose somewhat longer pulses since they are more concerned with sensitivity than resolution. Therefore, the fixed-carrier radar signal bandwidth has a range of uncertainty, essentially limited by the laws of physics, that system 100 can easily accommodate. The signal bandwidth is, roughly, the reciprocal of the pulse width for pure-tone carriers. When equation 4 is calculated for incident signals at a plurality of different AOAs, as provided in Table 1, the maximum allowed spectral line spacing before the phase-slope result becomes ambiguous are all greater than 10 MHz. Thus, the processing of system 100 to determine the AOA will be unambiguous. When the signal's carrier is not a pure tone, such as for spread spectrum type radar signals, that radar processing will likely still have an effective bandwidth less than about 10 MHz. An increased transmitted signal bandwidth will actually improve the processing of the system. It is only signals with too low a transmitted bandwidth, such as unmodulated continuous wave (CW) signals, that cause this system 100 not to be able to determine the wavefront AOA. CW radars with no modulation are rare. Furthermore, the slope values derived from equation 5 in Table 1, show that phase differences with frequency, while well below the 360 degree ambiguity limit, are sufficiently large to make system 100 practical with current technology (e.g., 70.7 degrees for a 10 MHz signal bandwidth for 40 degrees AOA). System 100 will measure the AOA as long as the incident signal is characterized with any type of sufficient-bandwidth modulation.

TABLE 1

| AOA ($\theta$) (Degrees) | Max. Allowed Spectral Spacing (MdF) (MHz) | Phase Slope (S) (Degrees/MHz) |
|---|---|---|
| 0 | undefined | 0.00 |
| 10 | 188.52 | 1.91 |
| 20 | 95.71 | 3.76 |
| 30 | 65.47 | 5.50 |
| 40 | 50.93 | 7.07 |
| 50 | 42.73 | 8.42 |

As above, in the one dimensional determination of AOA, it is assumed in the two dimensional determination of AOA that there are only two wide beamwidth antennas with overlapping main beams covering the desired field of view. It is further assumed here that the antennas have substantially different pointing angles, as in FIG. 2. The central processor 112 will use a look-up table to make a two dimensional (2d) determination of AOA. Alternatively, the central processor 112 computes the result using a computer model that includes the antenna configuration. The processing requires four inputs: 1) the time difference of arrival (TDOA) as determined by the 1d processing described above, and shown in Equation 7, or any other conventional method, 2) the measured amplitude from each antenna, as shown in Equations 12 and 13, 3) the receiver tuning frequency, and 4) a calibration table of the amplitude-difference values between the antennas (the amplitude-difference values being determined by taking the difference between the results of Equations 12 and 13) versus the TDOA values versus the frequency values versus the $\phi$ angle values. The $\phi$ angle is defined in following paragraphs. The amplitude differences are the same as the known antenna-gain differences provided the intercepted signal is sufficiently above the receiver's noise floor. The TDOA is valid for a set of 2d values, but only one of these values is consistent with the amplitude difference, if the angular range is restricted to a hemisphere. The single 2d-angle value that is consistent with the amplitude difference is made the 2d output. Essentially, the processing of system 100 combines the TDOA answer with the amplitude difference measurement value to obtain a 2d AOA output that is consistent with both. The TDOA can be determined by the narrowband processing disclosed herein or by other wideband processing techniques, such as the TDOA approaches described in the Background.

Figure 7:
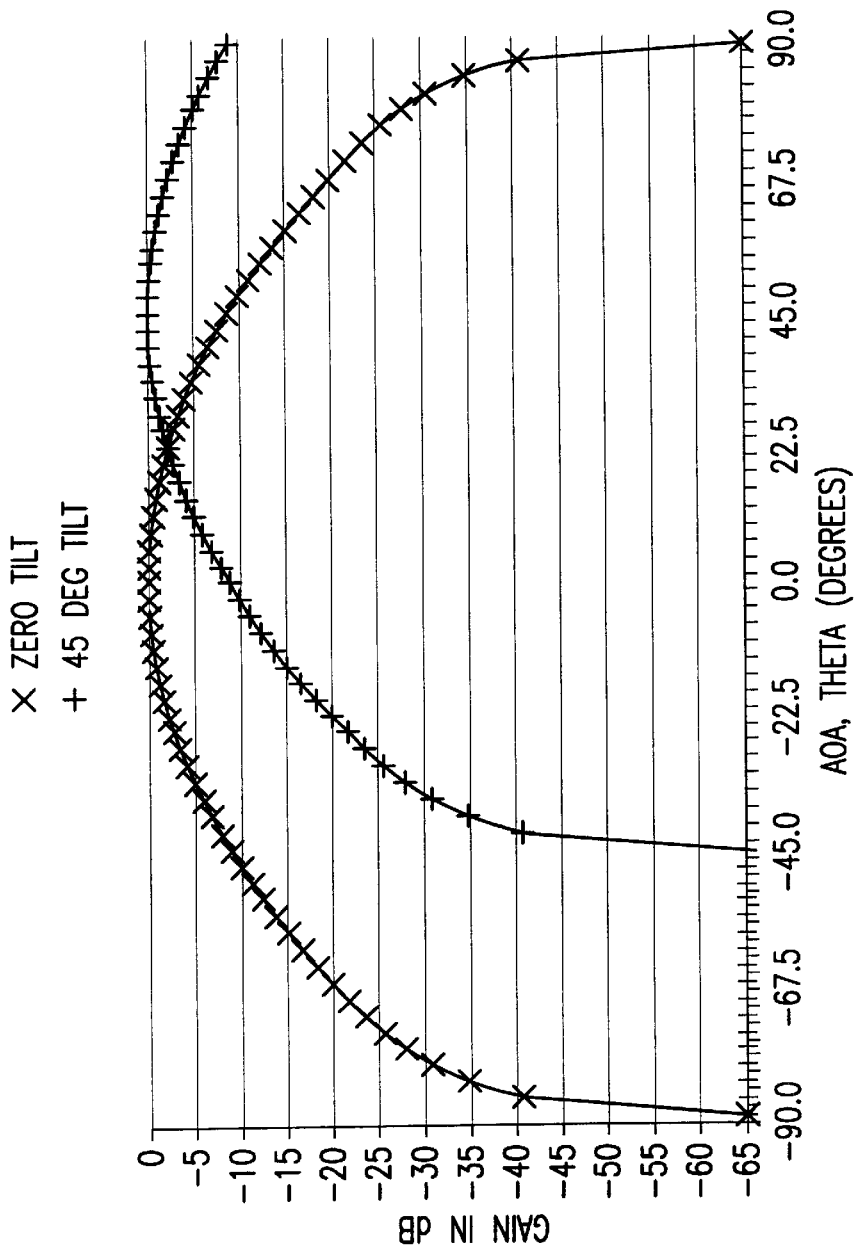
FIG. 7 is a graphical representation of model antenna patterns used in a simulation of the present invention.

To show that this processing method will indeed yield an unambiguous 2d AOA answer, a computer model was constructed and evaluated. The sample result being described uses the following parameters. The angular coordinate convention is that from the textbook by Souders (Mott Souders, "The Engineer's Companion," John Wiley and Sons, Inc., New York, 1966, ISBN 471 81395 8, page 25, FIG. 1–40). Theta (θ) is with respect to the z-axis and phi (φ) is with respect to the x-axis in the xy plane. The reference antenna is mounted in the xy plane, so an incoming wave with θ equal to zero is coming straight into the antenna's aperture face. That is, the z axis points straight into the aircraft frame. The antenna aperture is a square, three inches on a side, with one side parallel to the x axis. The frequency is 3 GHz, giving a broadbeam antenna gain of 7.59 dB. The second antenna is mounted an offset distance along the x-axis and has a tilt in the xz plane (i.e., azimuth) of 45 degrees. This example differs from the example of FIG. 2 which shows a tilt of ninety degrees. So, each antenna has an x address of zero for the reference and the offset distance for the other, while each incoming wave has a θ and φ. The computer model automatically disqualifies signal amplitudes below the receiver sensitivity so they do not give a false amplitude difference. The receiver sensitivity is set at 65 dB below the maximum signal strength. The computer model uses something like a finite-element approach, with each antenna aperture modeled with 121 miniature elements, or, equivalently, as one-element face intercepting 121 rays. FIG. 7 shows the antenna gain in dB for phi equal to zero as a function of θ over a 180 degree range. Note the broad beam that results from the above-noted parameters.

Figure 8:
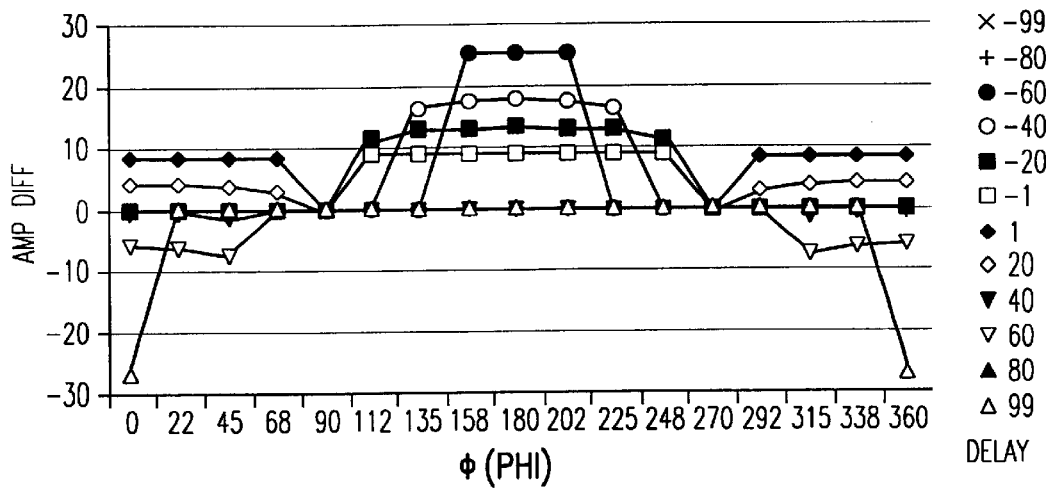
FIG. 8 is a graphical representation of amplitude difference data as a function of the out of plane angular offset and a way of deriving an output in the simulation of the present invention.

FIG. 8 shows the amplitude difference, on a log scale in dB, between these two antennas, with positive values for the case when the non-tilted no-offset reference-antenna amplitude is stronger than the tilted offset antenna amplitude, as a function of both φ and a delay. These values are the values to be stored in a look-up table for processing to determine phi. Another look-up table provides the θ values (graph not shown). But it is much simpler to determine θ in Equation 18, based on knowledge of the antenna separation distance (D), the TDOA and the known speed of electromagnetic radiation (c), derived from Equation 7.

$$\theta = \sin^{-1}\left(\frac{c(TDOA)}{D}\right) \quad (18)$$

Figure 9:
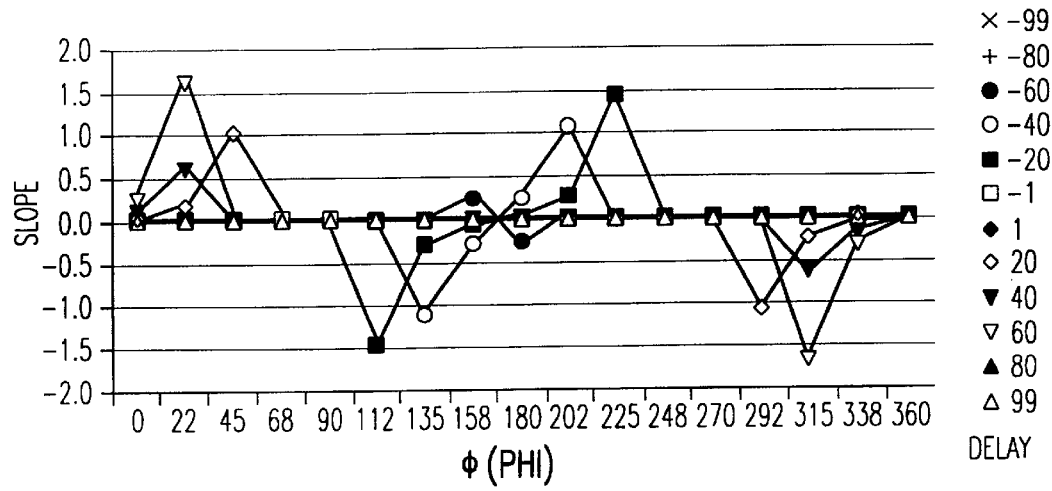
FIG. 9 is a graphical representation of the amplitude difference slope as a function of the out of plane and a way of deriving an output in the simulation of the present invention.

The requirement for unambiguous 2d AOA values is that, for each TDOA value, the graphed amplitude be single valued as a function of the unknown angle. That is, it is required that the slope of the curve not change sign. FIG. 9 shows the slope of the curves of FIG. 8, with unity slope being one dB per 22.5 degrees. This more clearly shows the consistent slope. There is no sign reversal unless φ crosses 180 degrees (looking up versus looking down). Therefore, the processing gives an unambiguous 2d AOA value across a hemisphere field of view. Although the calibration difficulties associated with conventional systems still make the 2d result somewhat coarse, the 2d result of system 100 will generally be far more accurate than conventional amplitude difference approaches which cannot compensate for the error that results from the elevation angle. While the 2d results have been described as being defined in terms of θ and φ, it should be understood that those angles are relative to the orientation of the aircraft, and may be translated to respective azimuth and elevation angles, as they are conventionally defined.

System 100, as shown in FIG. 3, performed the data conversion from the time-domain to the frequency-domain in the IF portion of the respective receivers coupled to antennas 20 and 30. The spectral separators 107, 108 utilize a plurality of narrow band filters, defined by the mixers 121, 122, local oscillator 120 and averaging circuits 123, 124 (shown in FIG. 4). Each of the narrow filters was tuned to a separate and distinct narrow band which represented a "point" on the spectrum of the incident RF signal, that tuning being controlled by the frequency of the local oscillator 120. That narrow band filtering approach to the IF signal achieved the goal of reducing the sampling rate requirement for the analog to digital converters 125, 126 that were used to digitize the frequency domain data. That same goal can also be achieved by similarly processing the RF signal from the antenna 20, 30, as will be discussed with respect to FIGS. 10 and 11 in following paragraphs.

Figure 10:
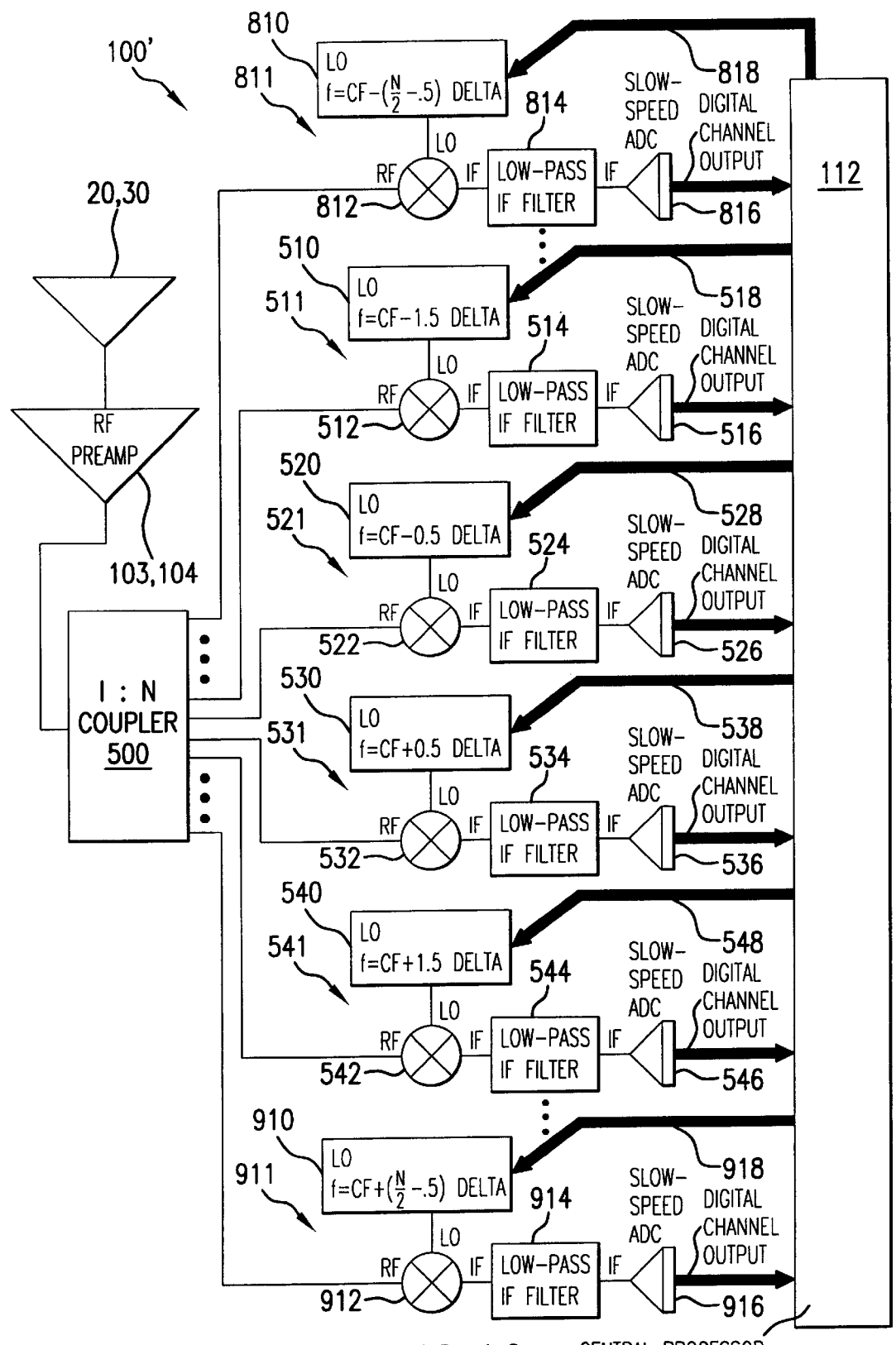
FIG. 10 is a block diagram of an alternate configuration of the present invention.

Referring now to FIG. 10, there is shown system 100' for determining a direction of incident electromagnetic signals using a single conversion architecture. As in the configuration previously discussed, each antenna 20, 30 is coupled to a respective RF preamplifier 103, 104, and ultimately the digitized frequency domain data is coupled to the central processor 112, for performing the computations as previously discussed. The output of preamplifier 103, 104 is coupled to a 1 to N line coupler 500, for dividing the RF signal between N number of receivers 811, 511, 521, 531, 541, 911 that beat (demodulate) the RF signal to predetermined IF frequencies, in parallel. N represents the number of receivers which are "ganged" together, the number of receivers being selected based on the number of "spectral points" to be obtained for processing to derive the AOA value.

Each receiver 811, 511, 521, 531, 541, 911 is defined by a mixer that modulates the RF signal with a local oscillator signal provided by a tunable local oscillator. The receiver further includes a low pass IF filter. The IF output from each of the receivers is coupled to a low-speed analog to digital converter (the ADC may be incorporated in the receiver, or a separate device) to provide the digital channel output to the central processor 112. Specifically, mixer 532 is coupled to an output of coupler 500 and has a local oscillator input port coupled to the local oscillator 530. Local oscillator 530 is tuned to a frequency that is equal to the center frequency (CF) of the RF carrier of the incident signal plus 0.5 times the predetermined channel separation frequency "Δ" (delta). Local oscillator 530 has a tuning command input line 538 coupled to central processor 112 for input of tuning control signals. As previously discussed with respect to the local oscillator 109 of FIG. 3, the local oscillators of FIG. 10 may be controlled by a separate receiver controller instead of combining that function with the AOA computation function of processor 112. The IF output of mixer 532 is coupled to a low pass filter 534, with the filtered output then being coupled to the analog to digital converter 536 that in turn provides the digital channel output data to central processor 112.

Still on the plus side of the center frequency, mixer 542 is provided for combining the RF signal from coupler 500 with a local oscillator frequency which is equal to the center frequency plus 1.5 times the channel separation frequency. The local oscillator signal is provided from local oscillator 540 which is coupled to central processor 112 through the tuning command line 548. Any number of further receivers tuned to the center frequency plus a positive offset may be incorporated to divide the spectrum of the incident RF signal. The larger the number of receivers that are ganged together, the more flexible and accurate system 100 will be. Thus, an endmost receiver 911 on the plus side of the center frequency has a mixer 912 coupled to coupler 500, the mixer having a local oscillator input port coupled to the local oscillator 910 which generates a frequency equal to the center frequency plus the quantity N/2 minus 0.5, times the channel separation frequency. The local oscillator 910 is coupled to central processor 112 through the tuning command line 918. The IF output of mixer 912 is coupled to low pass filter 914. The filtered output of low pass IF filter 914 is coupled to the ADC 916 for providing the digital channel output data to central processor 112.

Similarly, system 100' includes a mixer 522 having an RF input coupled to coupler 500 and a local oscillator input port coupled to the local oscillator 520. Local oscillator 520 generates a signal having a frequency equal to the center frequency minus 0.5 times the channel separation frequency. The tuning command signals are coupled to local oscillator 520 from central processor 112 through the line 528. The IF output of mixer 522 is coupled to low pass filter 524 having an IF output coupled to the ADC 526, which in turn outputs the digital channel output data to central processor 112. Still further, a mixer 512 has an RF input coupled to coupler 500 and receives the local oscillator signal having a frequency that is equal to the center frequency minus 1.5 times the channel separation frequency provided by local oscillator 510. Local oscillator 510 receives its tuning command signals from central processor 112 through the coupling line 518. The IF output of mixer 512 is coupled to low pass filter 514 that is in turn coupled to the ADC 516. ADC 516 provides the digital channel data to central processor 112. Again, any number of further receivers may be ganged hereto to further divide the frequency spectrum of the incident RF signal. Thus, an endmost receiver 811 on the negative side of the center frequency would include a mixer 812 having an input coupled to the coupler 500 and a local oscillator input port that receives a signal having a frequency equal to the center frequency minus the quantity N/2 minus 0.5, times the channel separation frequency, provided by local oscillator 810. The tuning of local oscillator 810 is provided by command signals from central processor 112 through coupling line 818. The IF output of mixer 812 is coupled to the low pass IF filter 814 that in turn provides the IF input to the ADC 816. ADC 816 provides the digital channel data to central processor 112. As all of the receivers 811, 511, 521, 531, 541, 911 are of equal bandwidth, that bandwidth being a narrow bandwidth which is less than the RF incident signal bandwidth, each of the low pass IF filters 814, 514, 524, 534, 544, 914 are identical, and provide identical channel band pass shapes. The channel separation frequency (delta) is equivalent to the frequency domain sample separation, which is greater than or equal to the channel bandwidth. The channel separation frequency approximates the expected signal (3 dB) bandwidth divided by the total number of channels (receivers).

The ADC sampling rate requirement must meet the Nyquist Sampling criteria for band-limited sampling. Therefore, the sampling rate must be equal to at least the channel bandwidth, which is equal to the channel frequency spacing. This is in contrast to conventional AOA measurement systems that convert time-domain IF data to digital data and then convert that digital time-domain data to frequency-domain data using Fast Fourier Transform processing. Such conventional systems have analog to digital data conversion rates that are extremely high and both difficult and expensive to implement.

Figure 11A:
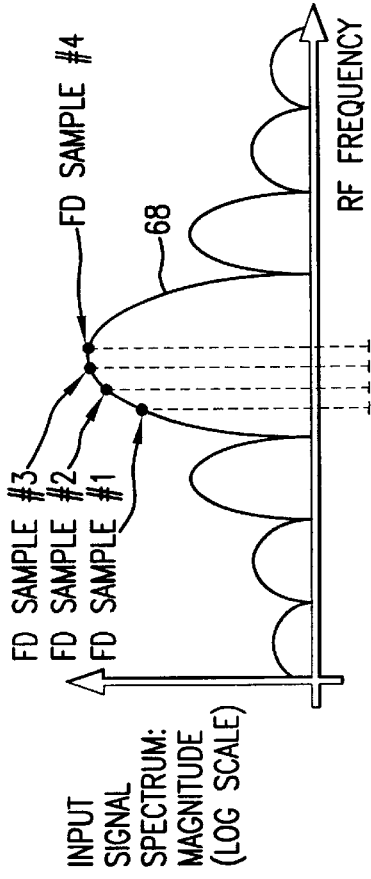
FIG. 11 A is a graphical representation of the input signal spectrum showing the frequency domain sample points thereon; and, FIG. 11B is a graphical representation of the front-end passband gain of the configuration of the present invention shown in FIG. 10.
Figure 11B:
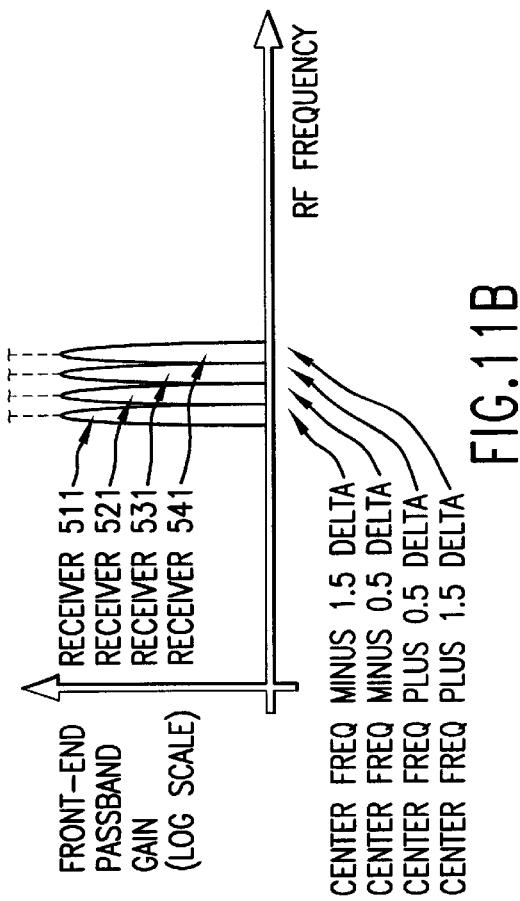

Turning now to the graphs of FIGS. 11A and 11B, such show an application of system 100' where the receiver's center frequency is shown with a slight turning error. The graph of FIG. 11A shows the input signal spectrum 68 for the incident RF signal received by the antenna 20, 30. For the application shown, system 100' is formed by four receivers 511, 521, 531, and 541 having respective passbands at the receiver's center frequency minus 1.5 times the channel separation frequency, the receiver's center frequency minus 0.5 times the channel separation frequency, the receiver's center frequency plus 0.5 times the channel separation frequency, and the receiver's center frequency plus 1.5 times the channel separation frequency. The different frequency passbands of receivers 511, 521, 531, and 541 effectively sample the spectrum of the RF incident signal to define frequency domain (FD) samples which may be digitized using respective low speed analog to digital converters 516, 526, 536, and 546. As shown, a slight center frequency tuning error does not affect the accuracy of the result. The sampling speed of the analog to digital converters is a function of the channel bandwidth, and therefore the sampling rate is approximately the inverse of one fourth of the expected incident RF signal bandwidth.

By this arrangement, the measured frequency domain phases are sufficiently accurate for AOA measurement purposes, even though the ADCs 816, 516, 526, 536, 546, and 916 are much slower than the time-difference-of-arrival of the incident RF signal wavefront between the antennas 20 and 30. Thus, by combining a plurality of narrow-band receivers so as to provide respective frequency domain samples by analog-circuit processing, angle of arrival measurements can be obtained without the need for a Fast Fourier Transform device for processing in central processor 112, and without the need for high speed analog to digital converters, that is, without analog to digital converters which have a sampling rate less than the reciprocal of the time difference of arrival resolution needed for the required AOA resolution.

The preceding paragraphs have described two channelized implementation variants of the system, that using a double conversion in FIG. 3 and FIG. 4, and that using a single conversion in FIG. 10. Channelization provides the feature of "instantaneous" AOA determination. "Instantaneous" AOA measurement is very important for many applications. An example of "instantaneous" AOA determination is determining the AOA based on a single radar pulse. However, those skilled in the art of RF receiver design will readily be able to use these descriptions to make a swept-receiver variant (one receiver for each antenna, with a common tuned LO). Such a variant design will lose the "instantaneous" measurement feature, but will more-economically provide the AOA for a continuously-present repetitive signal.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is being claimed is:

1. A system for determining a direction of incident electromagnetic signals, comprising:
   at least a pair of spaced antennas having overlapping fields of view for respectively receiving a transmitted signal;

at least a pair of receivers respectively coupled to said pair of antennas, each of said receivers including (a) a spectral separator having a plurality of output signals, each of said output signals representing a signal value at one of a plurality of predetermined frequencies, and (b) a plurality of analog to digital converters coupled to a corresponding one of said spectral separators for respectively providing a digital representation of each of said output signals; and, a digital processor coupled to an output of each said plurality of analog to digital converters for calculating an angle of arrival of said transmitted signal from said digital representations of said output signals from said spectral separators.

2. The system as recited in claim 1, wherein said spectral separator includes a plurality of mixers, each of said mixers having a first input coupled to a corresponding one of said antennas for input of said transmitted signal thereto and a second input coupled to a respective local oscillator, each said local oscillator having a frequency selected to downconvert said transmitted signal at a predetermined spectral point and thereby provide a corresponding output signal representing frequency domain data.

3. The system as recited in claim 1, wherein each said receiver includes a mixer for downconverting said transmitted signal to an intermediate frequency signal.

4. The system as recited in claim 3, wherein said spectral separator includes a plurality of filters having inputs respectively coupled to said mixer for input of said intermediate frequency signal thereto, each of said filters having a predetermined pass band selected to pass signals within a predetermined spectral range and thereby provide a corresponding output signal representing frequency domain data.

5. The system as recited in claim 4, wherein said plurality of said filters are respectively formed by a plurality of averaging circuits, each of said averaging circuits having an output coupled to an input of a respective one of said plurality of analog to digital converters.

6. The system as recited in claim 4, wherein each said filter includes a second mixer having said intermediate frequency signal coupled to a first input thereof, and a local oscillator signal of predetermined frequency to a second input thereof.

7. The system as recited in claim 5, wherein each said receiver includes an intermediate frequency amplifier having an input coupled to an output of said mixer and an output coupled to said inputs of said plurality of filters.

8. The system as recited in claim 2, wherein each said receiver includes a radio frequency preamplifier having an input coupled to said corresponding antenna and a coupler having an input coupled to an output of said preamplifier and a plurality of outputs respectively coupled to said first input of said plurality of mixers.

9. The system as recited in claim 1, wherein said digital processor calculates a time difference of arrival for said transmitted signal between said pair of antennas.

10. A method for determining a direction of incident electromagnetic signals, comprising the steps of:
a. receiving a transmitted signal at each of at least two antennas to provide at least a first radio frequency signal and a second radio frequency signal;
b. demodulating and spectrally dividing said first radio frequency signal to provide a plurality of analog first output signals respectively corresponding to signal values at different ones of a plurality of predetermined spectral locations;
c. demodulating and spectrally dividing said second radio frequency signal to provide a plurality of analog second output signals respectively corresponding to signal values at said different ones of said plurality of predetermined spectral locations;
d. converting said plurality of analog first and second output signals to a plurality of first and second digital representations thereof; and,
e. calculating an angle of arrival of said transmitted signal from said first and second digital representations of said analog first and second output signals.

11. The method as recited in claim 10 where the step of demodulating and spectrally dividing includes the steps of:
downconverting said first and second radio frequency signals to corresponding first and second intermediate frequency signals;
filtering said first intermediate frequency signal to establish a first plurality of signals at discrete and separate narrow spectral bands; and,
filtering said second intermediate frequency signal to establish a second plurality of signals at discrete and separate narrow spectral bands.

12. The method as recited in claim 11 where the step of filtering said first intermediate frequency signal includes the step of respectively averaging each of said first plurality of signals over a corresponding one of said narrow spectral bands.

13. The method as recited in claim 12 where the step of filtering said second intermediate frequency signal includes the step of respectively averaging each of said second plurality of signals over a corresponding one of said narrow spectral bands.

14. The method as recited in claim 10 where the step of demodulating and spectrally dividing includes the steps of:
coupling said first radio frequency signal to a first plurality of mixers, each of said first plurality of mixers having a respective local oscillator signal input thereto of a separate and distinct frequency to thereby establish said plurality of analog first output signals; and,
coupling said second radio frequency signal to a second plurality of mixers, each of said second plurality of mixers having a respective local oscillator signal input thereto of a separate and distinct frequency to thereby establish said plurality of analog second output signals.

15. The method as recited in claim 10 where the step of calculating an angle of arrival of said transmitted signal includes the step of calculating a phase slope between a pair of said spectral locations.

16. A method for determining a direction of incident electromagnetic signals, comprising the steps of:
a. receiving a transmitted signal at each of at least two spaced apart antennas having overlapping fields of view to provide at least a first radio frequency signal and a second radio frequency signal;
b. coupling said first radio frequency signal to a first plurality of receivers, each of said first plurality of receivers having a respective bandwidth less than a signal bandwidth of said transmitted signal and a center frequency offset from the others of said first plurality of receivers to establish a plurality of analog first output signals;
c. coupling said second radio frequency signal to a second plurality of receivers, each of said second plurality of receivers having a respective bandwidth less than a signal bandwidth of said transmitted signal and a center frequency offset from the others of said second plurality of receivers to establish a plurality of analog second output signals;

d. converting said plurality of analog first and second output signals to a plurality of first and second digital representations thereof; and, e. calculating an angle of arrival of said transmitted signal from said first and second digital representations of said analog first and second output signals.

17. The method as recited in claim 16 where said step of coupling said first radio frequency signal includes the step of providing each of said first plurality of receivers with a respective mixer having a corresponding local oscillator signal input thereto of a separate and distinct frequency from local oscillator signals input to mixers of the other of said first plurality of receivers.

18. The method as recited in claim 17 where said step of coupling said second radio frequency signal includes the step of providing each of said second plurality of receivers with a respective mixer having a corresponding local oscillator signal input thereto of a separate and distinct frequency from local oscillator signals input to mixers of the other of said second plurality of receivers.

19. The method as recited in claim 16 where said step of converting said plurality of analog first and second output signals includes the step of providing a plurality of analog to digital converters, each of said plurality of analog to digital converters being respectively coupled to an output of a corresponding one said first and second plurality of receivers.

20. A method for determining a direction of arrival of incident electromagnetic signals in two angular dimensions defined as $\theta$ and $\phi$, comprising the steps of:

providing at least two spaced apart antennas having overlapping fields of view and a relative tilt angle greater than zero degrees respectively coupled to receivers having a tuning frequency, the receivers having respective outputs coupled to a processor;

providing a calibration table of amplitude-difference values between the antennas versus time-difference-of-arrival values versus frequency values versus $\phi$ angles;

determining a time-difference-of-arrival for the incident electromagnetic signals;

determining a $\theta$ angle from said time-difference-of-arrival for the incident electromagnetic signals;

measuring an amplitude value of the incident electromagnetic signals received at each antenna;

determining a difference between said amplitude value from each antenna to define an amplitude-difference value between the antennas;

determining said tuning frequency of said receivers;

using said amplitude-difference value, said time-difference-of-arrival for the incident electromagnetic signals, and said tuning frequency to establish a corresponding $\phi$ angle from said calibration table.

21. The method as recited in claim 20, wherein said step of determining a $\theta$ angle includes the step of solving the equation:

$$\theta = \sin^{-1}\left(\frac{c(TDOA)}{D}\right)$$

where D=distance between said antennas, c=speed of light, and TDOA=said time-difference-of-arrival for the incident electromagnetic signals.

* * * * *